(12) United States Patent
Suteerawanit

(10) Patent No.: US 12,439,862 B1
(45) Date of Patent: Oct. 14, 2025

(54) DISASSEMBLABLE TRELLIS

(71) Applicant: Nick Suteerawanit, Laguna Woods, CA (US)

(72) Inventor: Nick Suteerawanit, Laguna Woods, CA (US)

( * ) Notice: Subject to any disclaimer, the term of this patent is extended or adjusted under 35 U.S.C. 154(b) by 0 days.

(21) Appl. No.: 19/041,986

(22) Filed: Jan. 30, 2025

(51) Int. Cl.
*A01G 9/12* (2006.01)
*A01G 7/04* (2006.01)
*A01G 22/05* (2018.01)

(52) U.S. Cl.
CPC ............ *A01G 9/124* (2013.01); *A01G 7/045* (2013.01); *A01G 22/05* (2018.02)

(58) Field of Classification Search
CPC ........... A01G 9/12; A01G 9/122; A01G 9/124
See application file for complete search history.

(56) References Cited

U.S. PATENT DOCUMENTS

| | | | | |
|---|---|---|---|---|
| 3,188,771 A | * | 6/1965 | Ballai | A01G 9/00 47/81 |
| 3,345,774 A | * | 10/1967 | Delbuguet | A01G 29/00 47/44 |
| 3,685,204 A | * | 8/1972 | O'Harra | A01G 9/122 47/47 |
| 4,048,752 A | * | 9/1977 | Anderson | A01G 9/12 47/47 |
| 4,584,792 A | * | 4/1986 | Etzel | A01G 9/124 47/70 |
| 5,425,203 A | * | 6/1995 | Scott | A01G 9/12 403/171 |
| 6,209,258 B1 | * | 4/2001 | Schneider | A01G 9/124 47/46 |
| 8,272,160 B1 | | 9/2012 | Hamann | |
| 9,392,755 B1 | * | 7/2016 | Lantis | A01G 27/00 |
| 2022/0071104 A1 | * | 3/2022 | Cheng | F16B 7/182 |

FOREIGN PATENT DOCUMENTS

| | | | | |
|---|---|---|---|---|
| CN | 21857097 | | 2/2021 | |
| CN | 112514696 | | 3/2021 | |
| CN | 212436504 | | 1/2022 | |
| DE | 102012010719 A1 | * | 12/2013 | ............... A01G 9/12 |
| DE | 202018100318 | | 3/2018 | |
| GB | 2309878 A | * | 8/1997 | ............. A01G 29/00 |
| KR | 20048612 | | 5/2018 | |
| KR | 101925243 | | 12/2018 | |

\* cited by examiner

*Primary Examiner* — Kristen C Hayes
(74) *Attorney, Agent, or Firm* — AGK Patent & Trademark Law; Philip Y Kim

(57) ABSTRACT

A trellis comprising a plurality of pole portions removably connected to one another via threaded connections or interference-fit connections; a top supporter removably connected to the plurality of pole portions via a threaded connection or a interference-fit connection; and a bottom base removably connected to the plurality of pole portions via a threaded connection or a interference-fit connection. Each of the plurality of pole portions having a middle hollow cylinder with a perforated chamber. Each perforated chamber having perforations that extend in a helical pattern along the pole portion. A light pole removably connected to the top supporter or to the plurality of pole portions via a threaded connection or a interference-fit connection. The light pole supporting an electrical wire that is electrically coupled to lights such as ultraviolet lights that shine on a plant that is supported by the trellis.

19 Claims, 29 Drawing Sheets

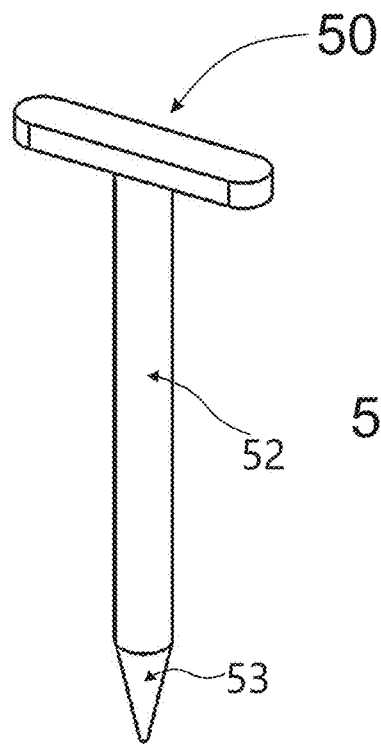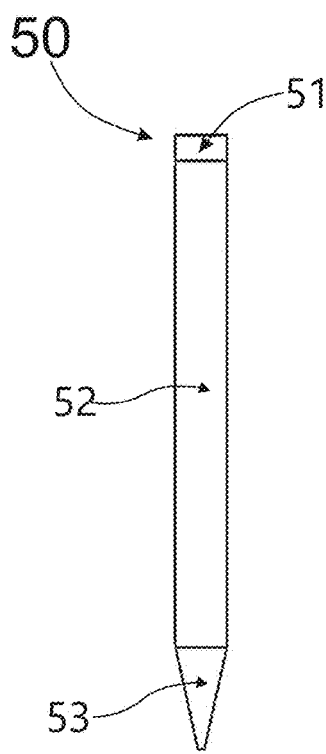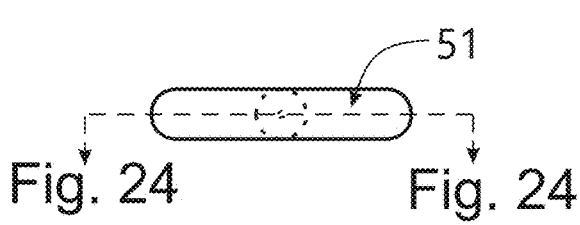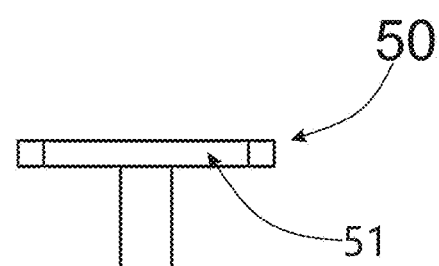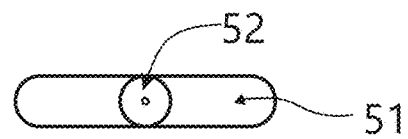
FIG. 18
FIG. 18A
FIG. 18B
FIG. 18C
FIG. 18D

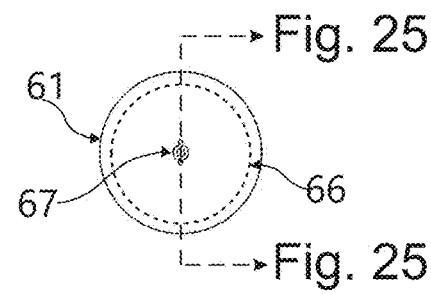
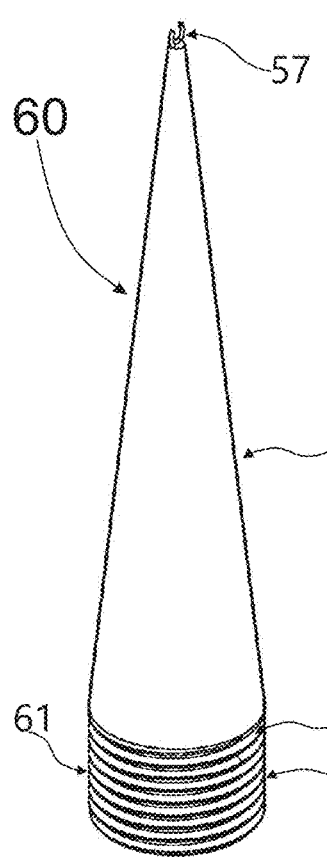
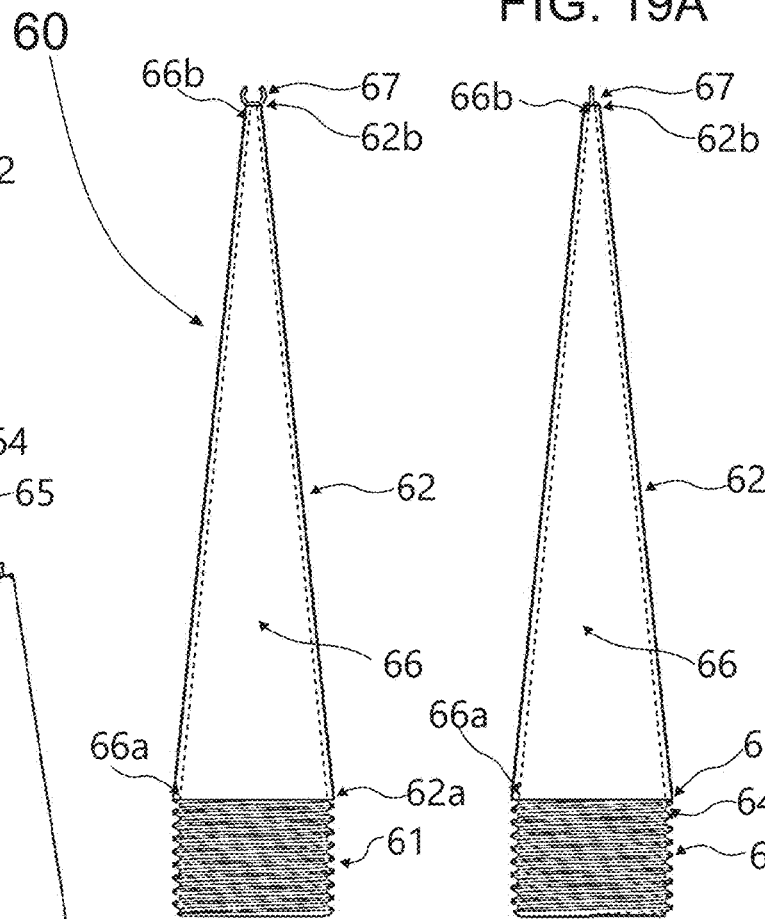
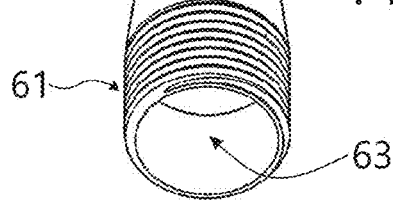
FIG. 19A
FIG. 19
FIG. 19C
FIG. 19B
FIG. 19E
FIG. 19D

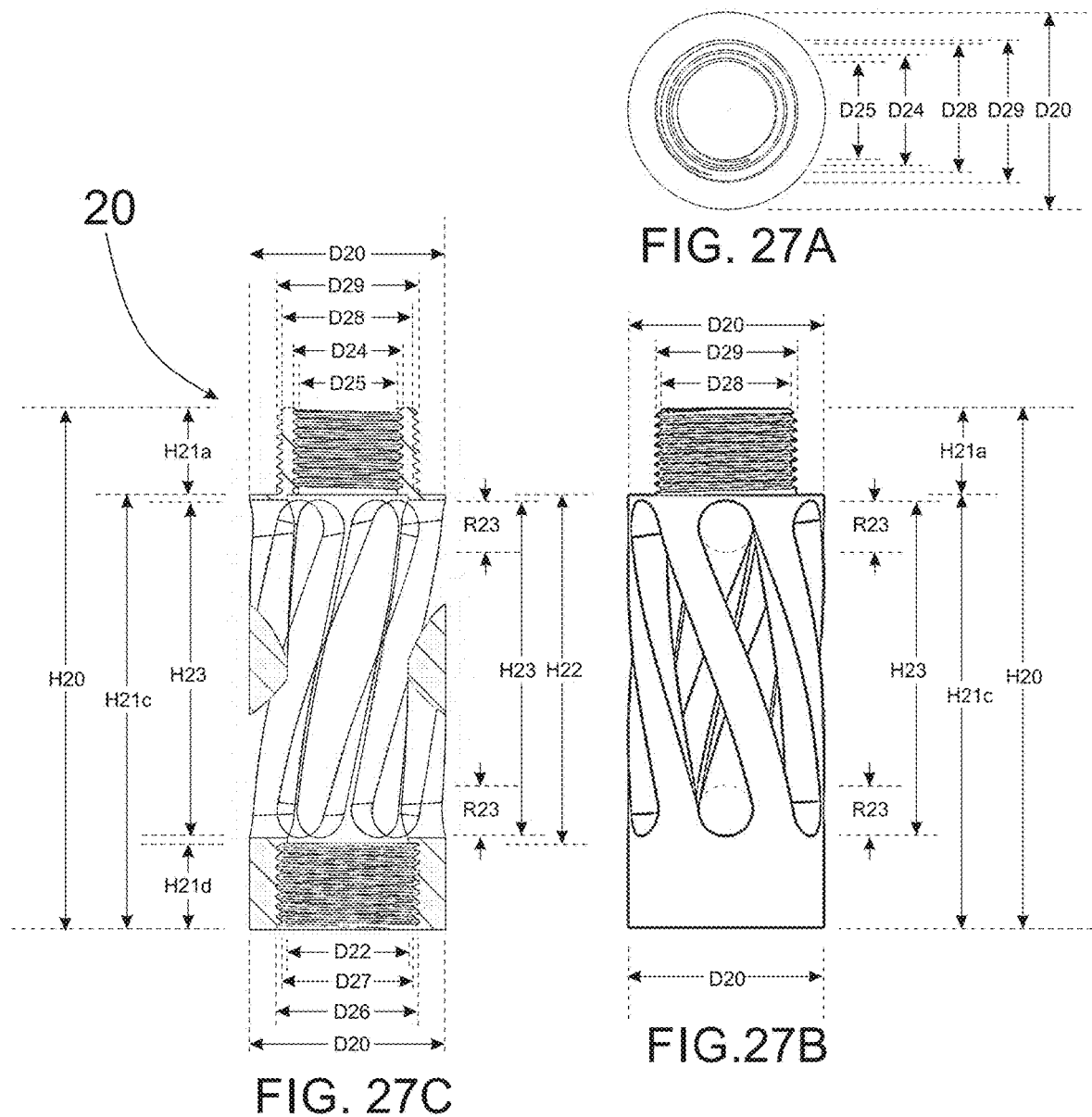

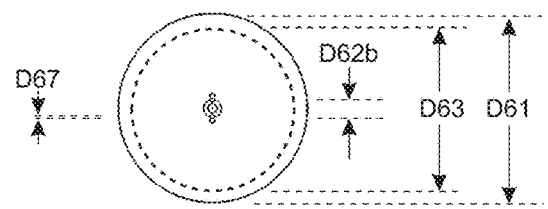
FIG. 31A
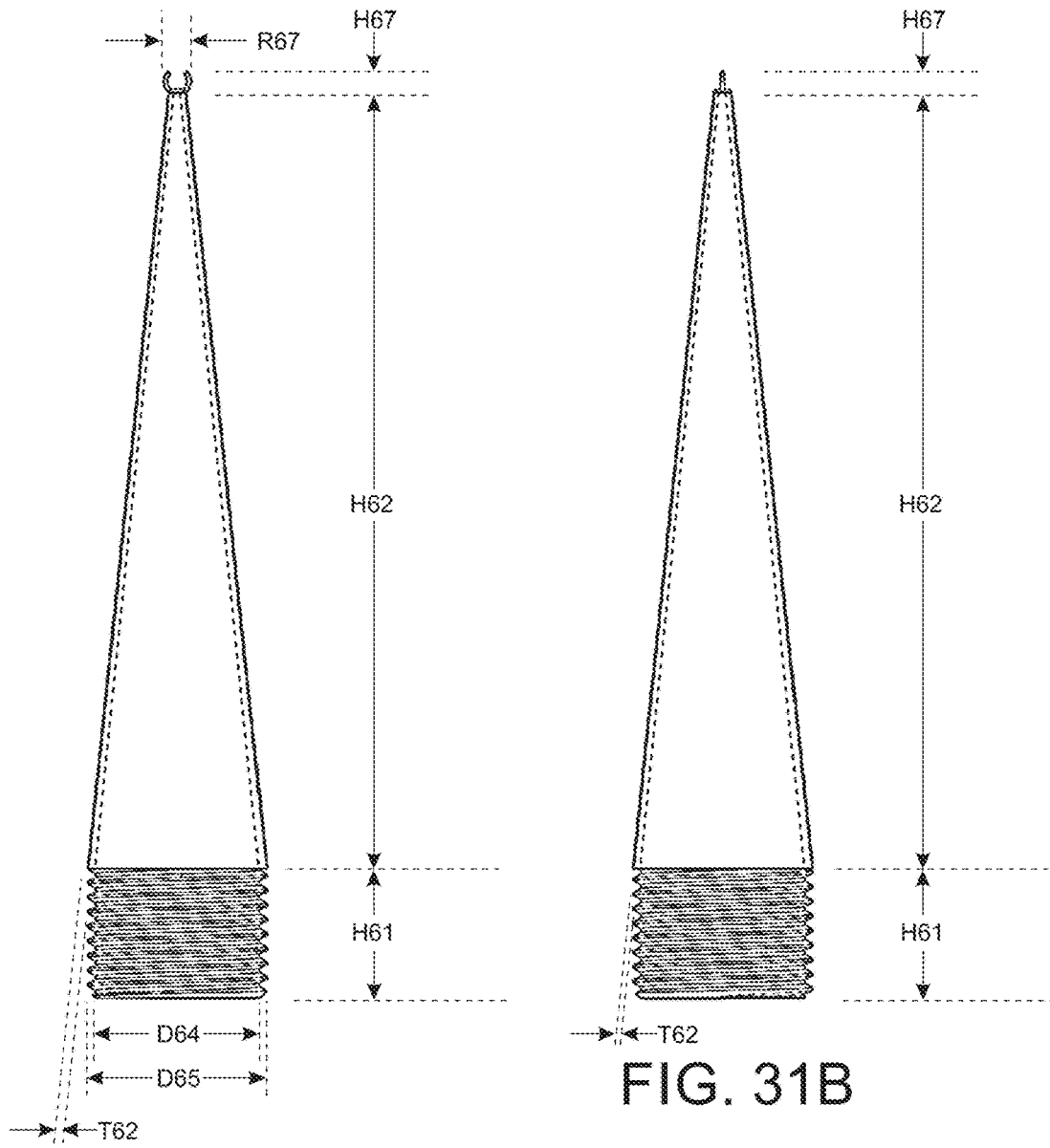
FIG. 31C
FIG. 31B
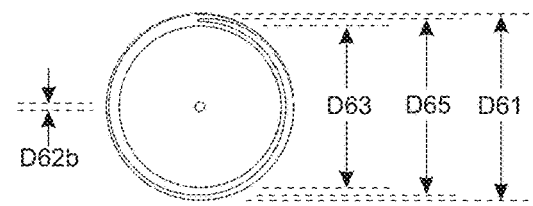
FIG. 31D

DISASSEMBLABLE TRELLIS

BACKGROUND OF THE INVENTION

The present invention relates to agriculture and in particular to agriculture of plants that require support when growing such as but not limited to dragon fruit plants.

Plants such as dragon fruit plants that require support when growing are generally grown using trellises for support. Most trellises in the art comprise a base, a support pole, and a top supporter. A plant grows from the ground and is connected to the support pole using string, wire, or another attachment mechanism. The support pole ensures that the plant grows upwards and therefore minimizes the horizonal space utilized by the plant, which is beneficial in an agricultural setting. The support pole may also ensure that the plant remains strong and healthy as it grows. When the plant grows to reach the top supporter of the trellis, the leaves of the plant may be allowed to spread out and contact the top supporter. In this manner, the trellis minimizes the horizontal space utilized by the stalk of the plant while allowing the leaves of the plant to spread out and thereby absorb more sunlight to keep the plant healthy.

Components of common trellises used in agriculture are generally quite large (around 1-5 ft at their largest dimension) and may or may not be removably connected to one another. Furthermore, these components are generally made of solid wood and are therefore quite heavy. This presents a disadvantage if trellises need to be moved. Because known trellises fail to present easily disassemblable and mobile solutions, there is a need for a better trellis.

BRIEF SUMMARY OF THE INVENTION

The present invention addresses the above and other needs by providing a disassemblable trellis with hollow components that may be threaded or an interference-fit together. The support pole may comprise a plurality of pole portions such that the support pole, the largest portion of the trellis, is easy to disassemble and transport. The present invention further provides a trellis system that utilizes the disassemblable trellis in conjunction with electrical wires and lights such as but not limited to ultraviolet lights or light emitting diodes (LEDs).

In accordance with one aspect of the invention, there is provided a trellis having a bottom base, a top supporter, and a plurality of pole portions. The plurality of pole portions may be removably connected to one another via threaded connections to form a pole. The bottom base and the top supporter may be removably connected to the plurality of pole portions via threaded connections.

In accordance with another aspect of the invention, there is provided a trellis having a bottom base, a top supporter, and a plurality of pole portions. The plurality of pole portions may be removably connected to one another via an interference-fit connections to form a pole. The bottom base and the top supporter may be removably connected to the plurality of pole portions via interference-fit connections.

In accordance with another aspect of the invention, each of the plurality of pole portions may comprise a middle hollow cylinder with a perforated chamber. The perforated chamber may have perforations that extend along the perforated chamber in a helical pattern to allow a plant stalk to grow up the plurality of pole portions in a helical pattern.

In accordance with another aspect of the invention, the bottom base may have a length and a width each of about 18 in. The bottom base may be placed inside of a nursery pot to prevent the trellis from falling over.

In accordance with another aspect of the invention, the bottom base may have a length and a width of about 30 in and may be placed directly on the ground. A plurality of T-nails may be configured through the bottom base to secure the bottom base to the ground and thereby preventing the trellis from falling over.

In accordance with another aspect of the invention, a light pole may be removably connected to the top supporter and/or to the plurality of pole portions via a threaded connection or an interference-fit connection. The light pole may be configured opposite the bottom base.

In accordance with another aspect of the invention, a plurality of trellises such as the trellis described herein may be used in a trellis system. The plurality of trellises may be connected together by fitting tubes, cables, ropes, or the like through the top supporters of the trellises. Electrical wires may be supported by the light poles of the trellises. Lights may shine on plants that are supported by the trellises. In some embodiments, the lights may be ultraviolet lights that may provide ultraviolet light to the plants. In other embodiments, the lights may be light emitting diodes (LEDs) that may shine visible light on the plants. Plants may be planted in the ground next to the trellises. Stalks of the plants may grow upwards and may be supported by the plurality of pole portions of the trellises. Leaves of the plants may grow through the top supporters of the trellises and may be supported by the top supporters.

BRIEF DESCRIPTION OF DRAWINGS

The above and other aspects, features and advantages of the present invention will be more apparent from the following more particular description thereof, presented in conjunction with the following drawings wherein:

FIG. 18 is a perspective view of a T-nail of the trellis according to the present invention.

FIG. 18A is a top view of the T-nail of the trellis according to the present invention.

FIG. 18B is a front view of the T-nail of the trellis according to the present invention.

FIG. 18C is a side view of the T-nail of the trellis according to the present invention.

FIG. 18D is a bottom view of the T-nail of the trellis according to the present invention.

FIG. 19 is a top perspective view of a threaded light pole of the trellis according to the present invention.

FIG. 19A is a top view of the threaded light pole of the trellis according to the present invention.

FIG. 19B is a front view of the threaded light pole of the trellis according to the present invention.

FIG. 19C is a side view of the threaded light pole of the trellis according to the present invention.

FIG. 19D is a bottom view of the threaded light pole of the trellis according to the present invention.

FIG. 19E is a bottom perspective view of the threaded light pole of the trellis according to the present invention.

FIG. 27A is a dimensioned top view of a threaded pole portion of the trellis according to the present invention.

FIG. 27B is a dimensioned front view of the threaded pole portion of the trellis according to the present invention.

FIG. 27C is a dimensioned cross-section view of the threaded pole portion of the trellis according to the present invention.

FIG. 27D is a dimensioned bottom view of the threaded pole portion of the trellis according to the present invention.

FIG. 31A is a dimensioned top view of the threaded light pole of the trellis according to the present invention.

FIG. 31B is a dimensioned front view of the threaded light pole of the trellis according to the present invention.

FIG. 31C is a dimensioned side view of the threaded light pole of the trellis according to the present invention.

FIG. 31D is a dimensioned bottom view of the threaded light pole of the trellis according to the present invention.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to descript a feature's appearance to the human eye or human perception, and not a precise measurement, or typically within 10 percent of a stated value.

Figure 1:
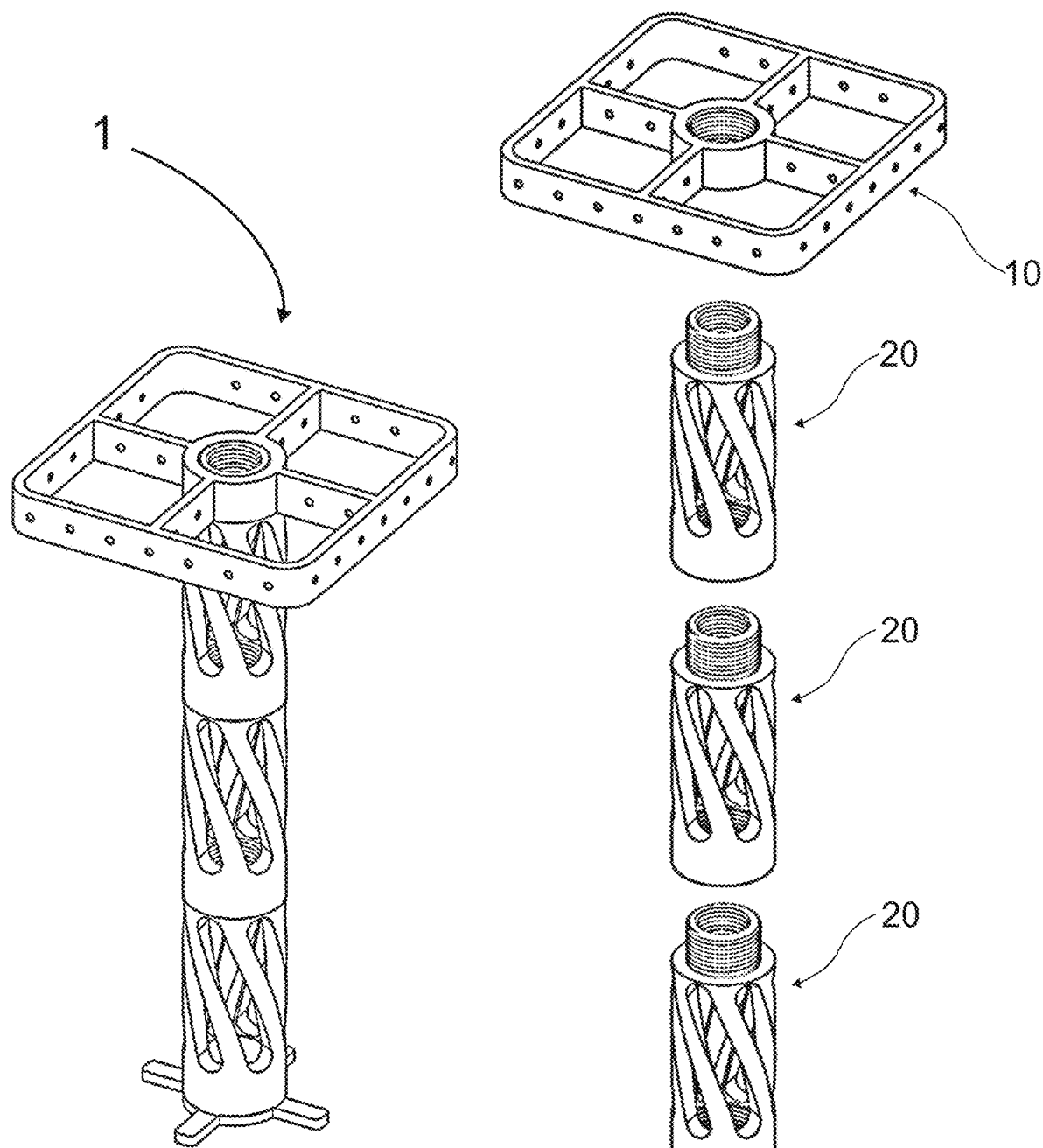
FIG. 1 is a perspective view of a trellis with threaded connections according to the present invention.
Figure 2:
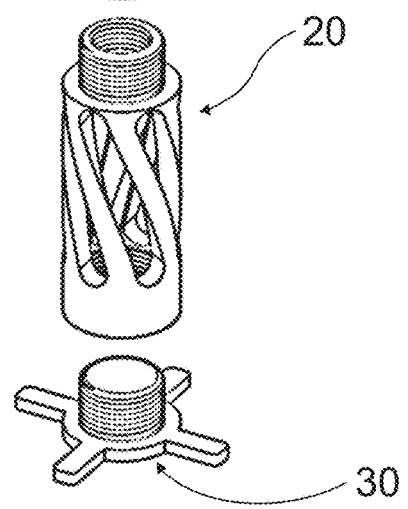
FIG. 2 is an exploded perspective view of the trellis with threaded connections according to the present invention.

A perspective view of a trellis 1 with threaded connections and a small bottom base is shown in FIG. 1 and an exploded view of the trellis 1 is shown in FIG. 2. A top supporter 10 is threaded onto a plurality of pole portions 20. Each of the plurality of pole portions 20 are threaded into one another to create a pole onto which the top supporter 10 is threaded. A small bottom base 30 is threaded into the plurality of pole portions 20 opposite the top supporter 10.

Figure 3:
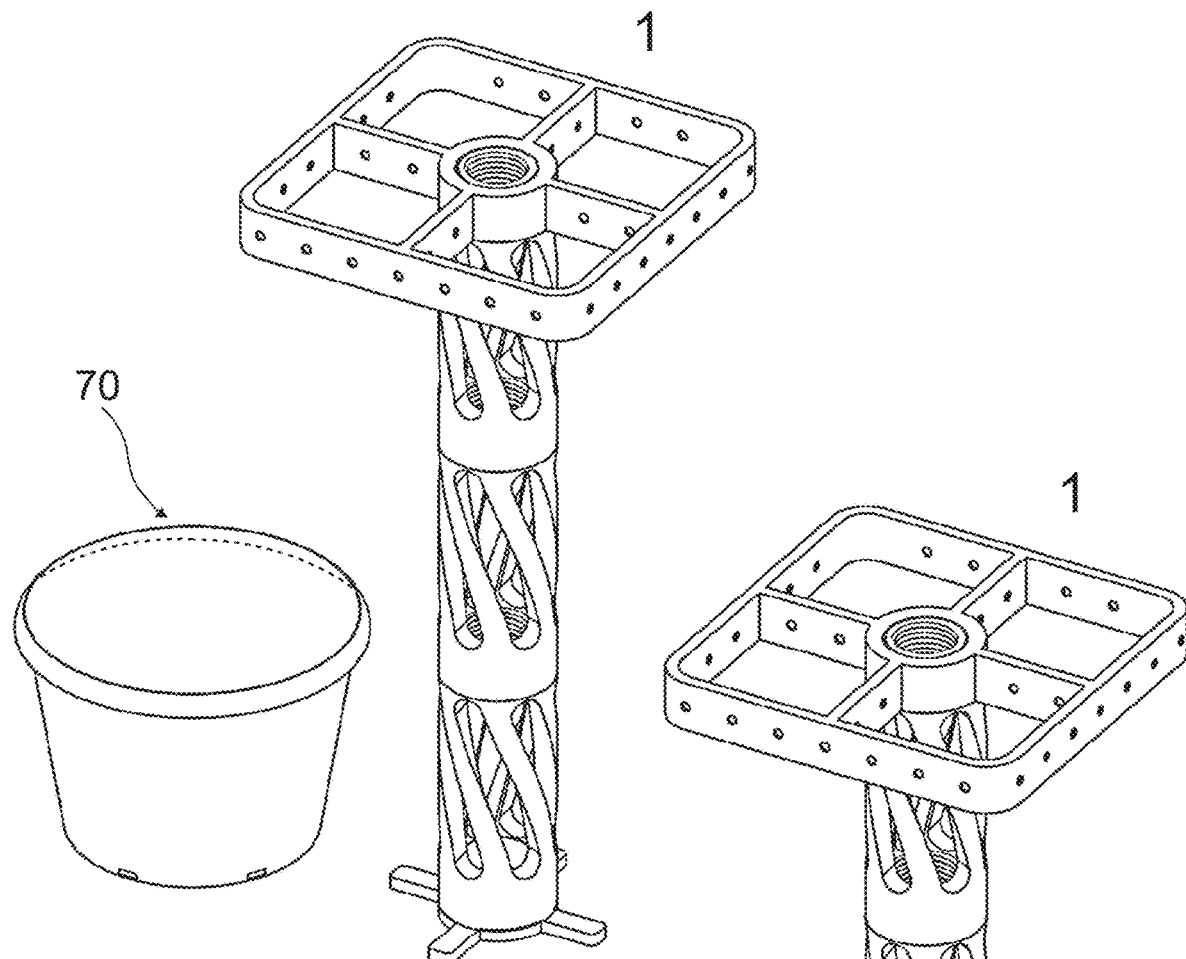
FIG. 3 is a perspective view of the trellis next to a nursery pot according to the present invention.
Figure 4:
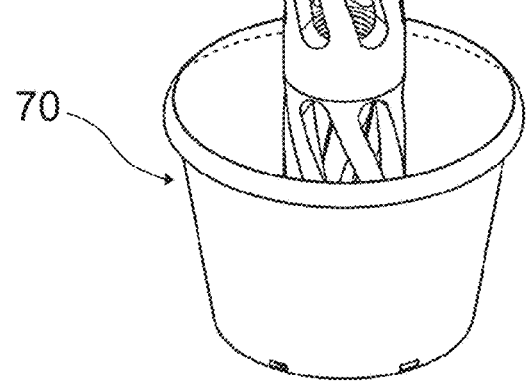
FIG. 4 is a perspective view of the trellis configured within the nursery pot according to the present invention.

A perspective view of the trellis 1 next to a nursery pot 70 is shown in FIG. 3, and a perspective view of view of the trellis 1 within the nursery pot 70 is shown in FIG. 4. The trellis 1 comprises the small bottom base 30 such that the small bottom base 30 can reside within the nursery pot 70 to prevent the trellis 1 from falling over. The nursery pot 70 may have a bottom base diameter of 18 in or more. The nursery pot 70 may have an internal volume of 20 gallons or more.

Figures 5, 6:
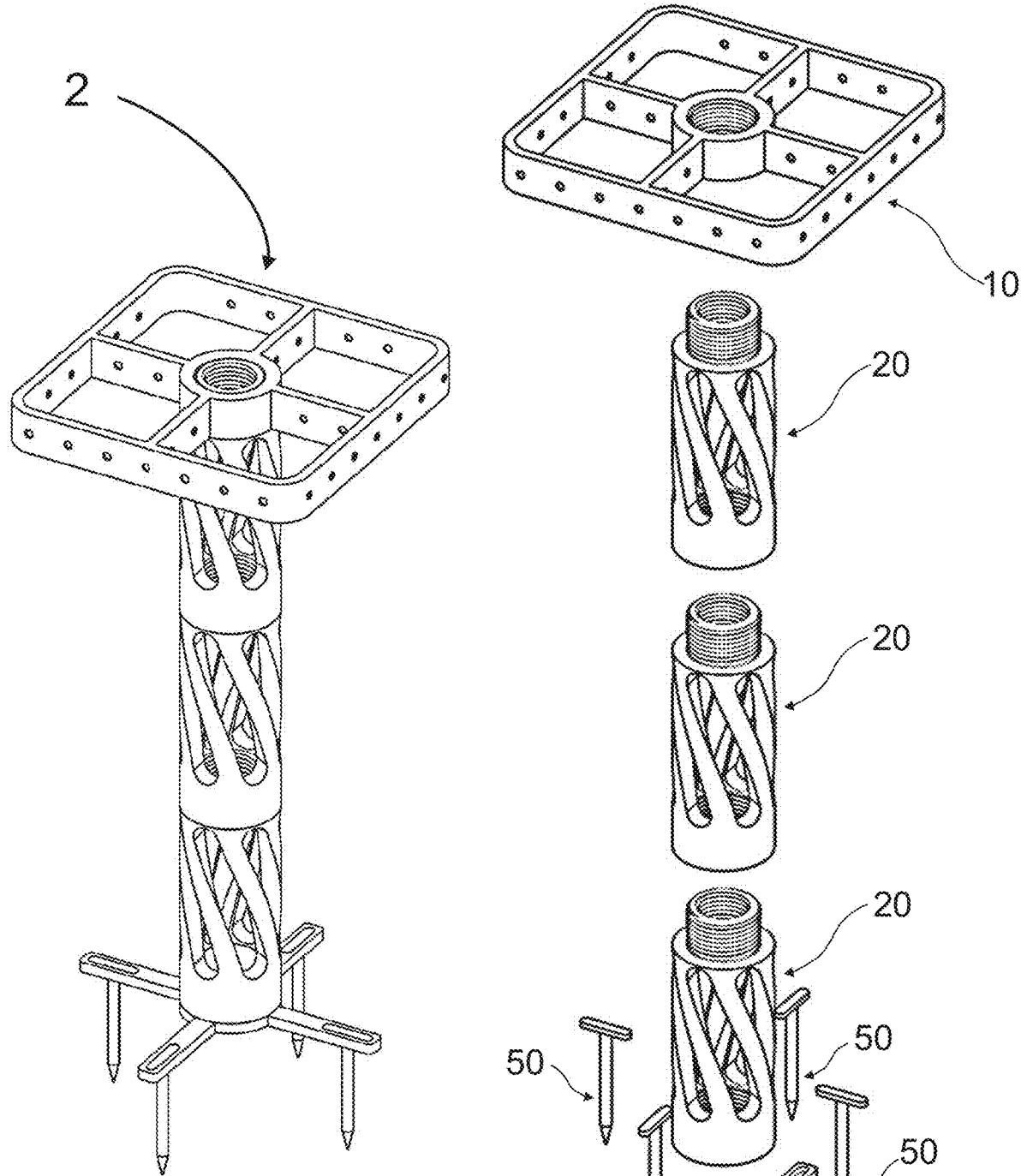
FIG. 5 is a perspective view of the trellis with T-nails configured through its bottom base according to the present invention.
FIG. 6 is an exploded perspective view of the trellis and T-nails according to the present invention.

A perspective view of a trellis 2 with threaded connections and a large bottom base 40 is shown in FIG. 5 and an exploded view of the trellis 2 is shown in FIG. 6. A top supporter 10 is threaded onto a plurality of pole portions 20. Each of the plurality of pole portions 20 are threaded into one another to create a pole onto which the top supporter 10 is threaded. A large bottom base 40 is threaded into the plurality of pole portions 20 opposite the top supporter 10. T-nails 50 are inserted through the large bottom base 40 to secure the trellis 2 to the ground to prevent the trellis 2 from falling over. In alternative embodiments, the T-nails 50 may be spikes, stakes, or any other elongated member inserted through the large bottom base 40 to secure the trellis 2 to the ground to prevent the trellis 2 from falling over.

Figures 7, 8:
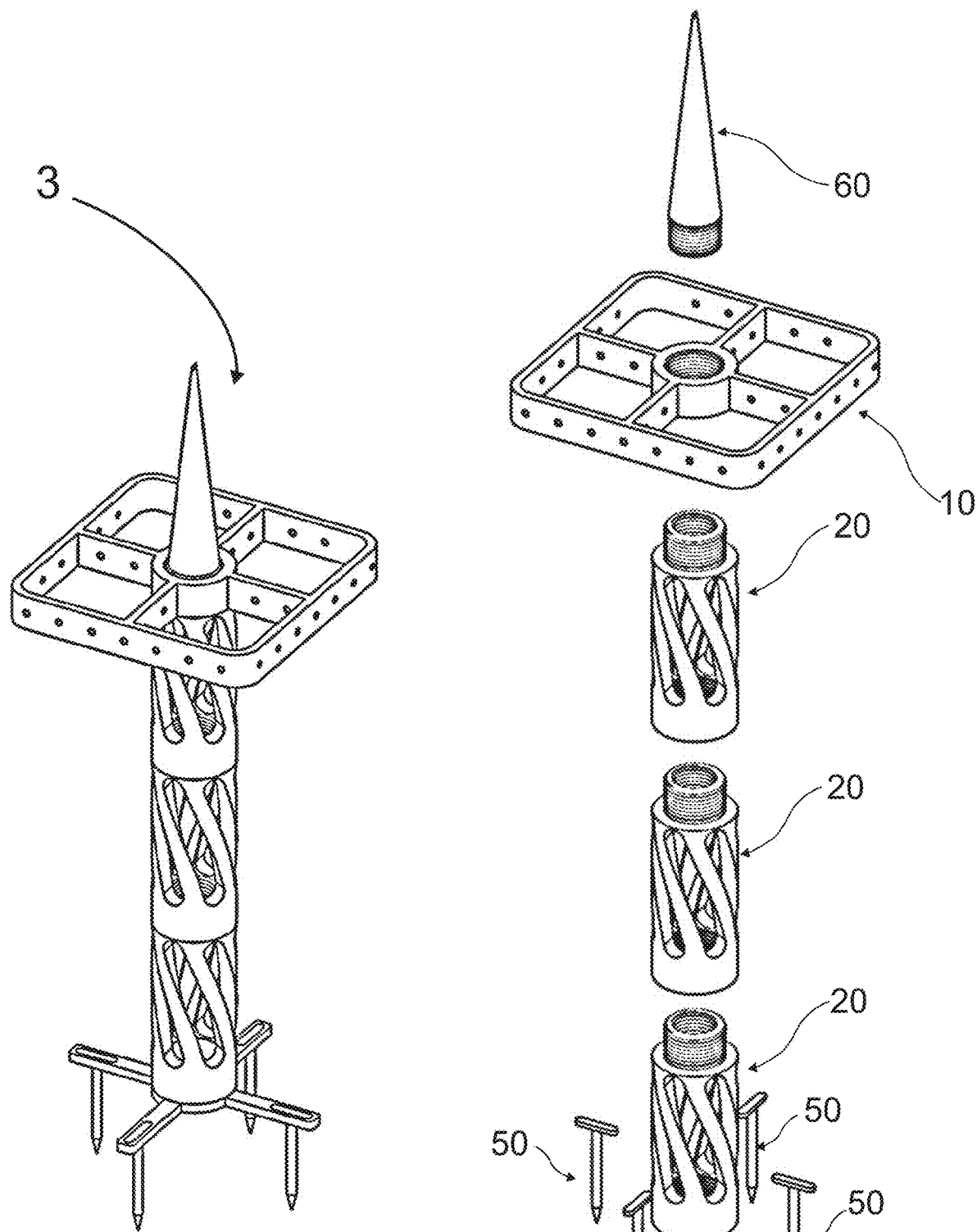
FIG. 7 is a perspective view of the trellis with a threaded light pole according to the present invention.
FIG. 8 is an exploded perspective view of the trellis and the threaded light pole according to the present invention.

A perspective view of a trellis 3 with threaded connections and a light pole 60 is shown in FIG. 7 and an exploded view of the trellis 3 is shown in FIG. 8. The top supporter 10 is threaded onto a plurality of pole portions 20. Each of the plurality of pole portions 20 are threaded into one another to create a pole onto which the top supporter 10 is threaded. The large bottom base 40 is threaded into the plurality of pole portions 20 opposite the top supporter 10. T-nails 50 are configured through the large bottom base 40 to secure the trellis 3 to the ground to prevent the trellis 3 from falling over. In alternative embodiments, the T-nails 50 may be spikes, stakes, or any other elongated member inserted through the large bottom base 40 to secure the trellis 3 to the ground to prevent the trellis 2 from falling over. A light pole 60 is threaded into the top supporter 10 such that the light pole 60 is configured opposite the large bottom base 40.

Figure 9:
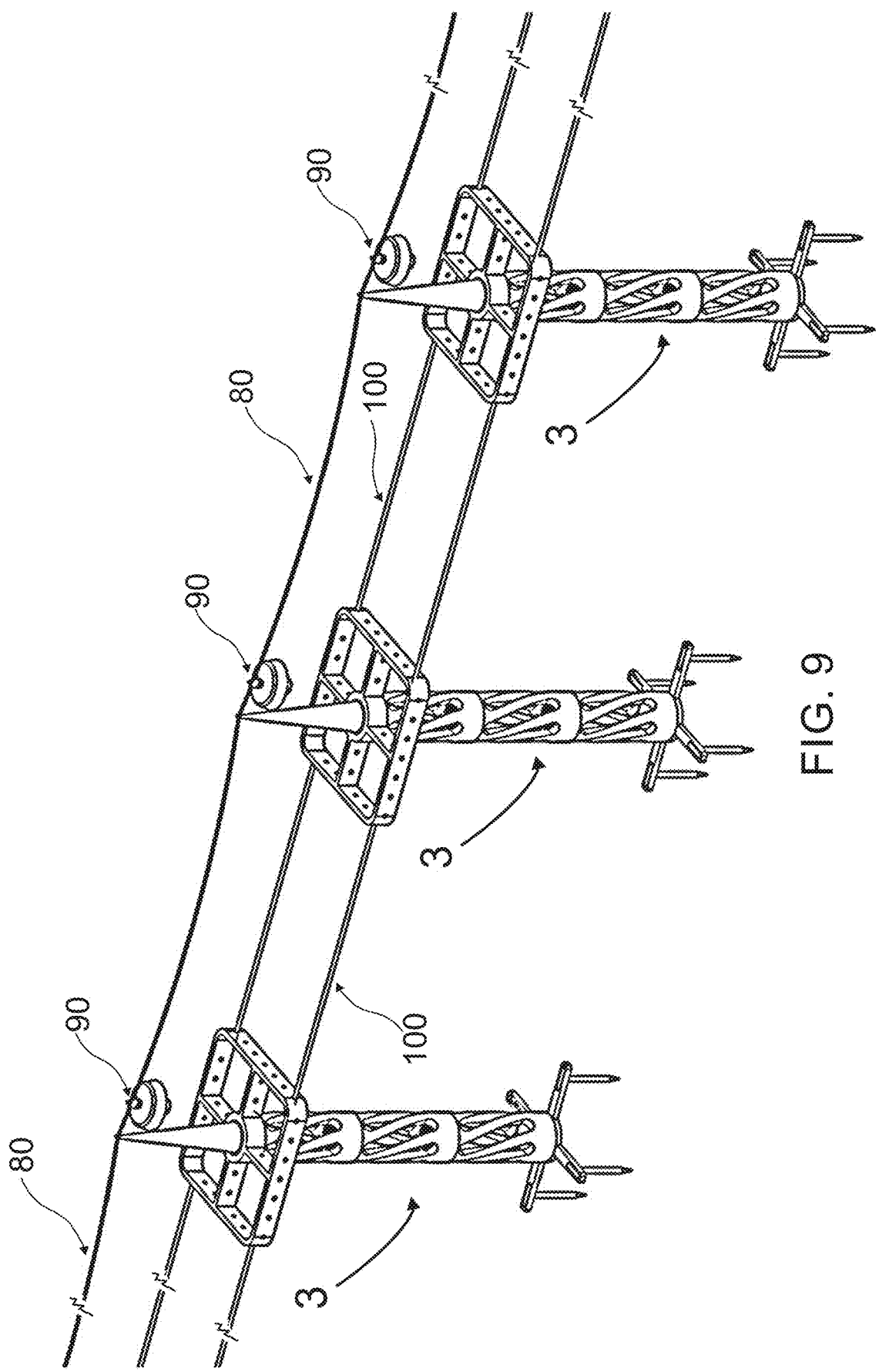
FIG. 9 is a perspective view of a trellis system according to the present invention.

A perspective view of a trellis system is shown in FIG. 9. A plurality of trellises 3 each comprise the top supporter 10, the large bottom base 40, the plurality of threaded pole portions 20, and the light pole 60. Electrical wires 80 are supported by the light poles 60 of the trellises 3. Lights 90 are electrically coupled to the electrical wires 80. The lights 90 may provide ultraviolet and/or other visible light to plants when the plants are supported by the trellises 3. Tubes 100 are attached through the top supporters 10 of the trellises 3 to maintain the trellises 3 in a configuration relative to one another. The tubes 100 may have diameters of about ½ in and lengths of about 5 ft. In alternative embodiments, the tubes 100 may be cables, ropes, wires, or any other elongated member capable of being inserted through the top supporters 10 of the trellises 3 to connect the trellises 3 together.

Figure 10A:
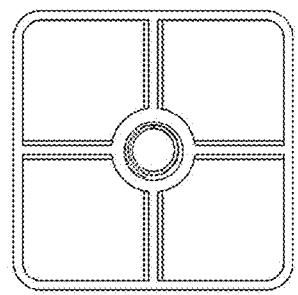
FIG. 10A is a top view of the trellis according to the present invention.
Figure 10C:
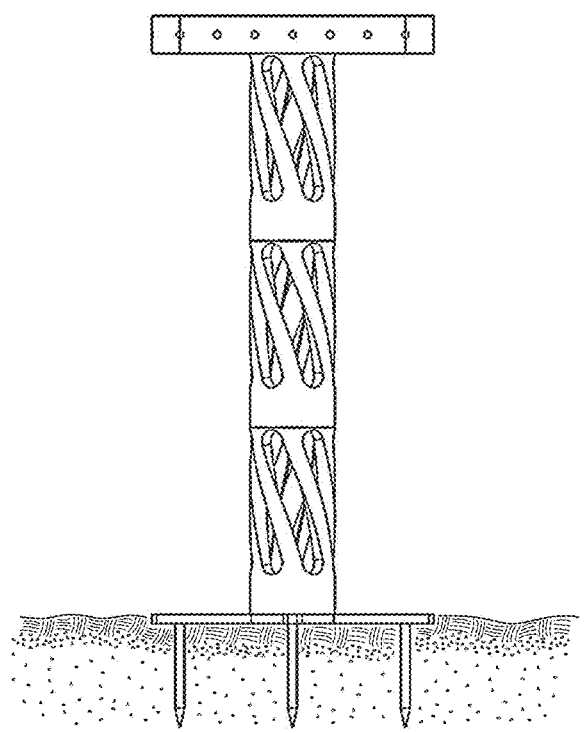
FIG. 10C is a side view of the trellis according to the present invention.
Figure 10B:
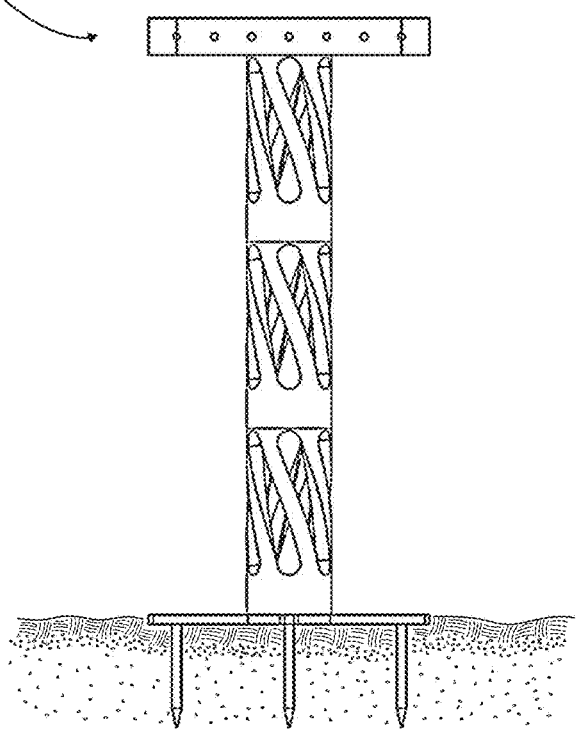
FIG. 10B is a front view of the trellis according to the present invention.
Figure 10D:
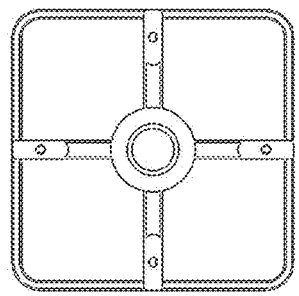
FIG. 10D is a bottom view of the trellis according to the present invention.

A top view of the trellis 2 with threaded connections and the large bottom base 40 is shown in FIG. 10A. A front view of the trellis 2 is shown in FIG. 10B, a side view of the trellis 2 is shown in FIG. 10C, and a bottom view of the trellis 2 is shown in FIG. 10D. The T-nails 50 inserted through the large bottom base 40 are further driven into the ground to hold the trellis 2 to the ground to prevent the trellis 2 from falling over.

Figure 11A:
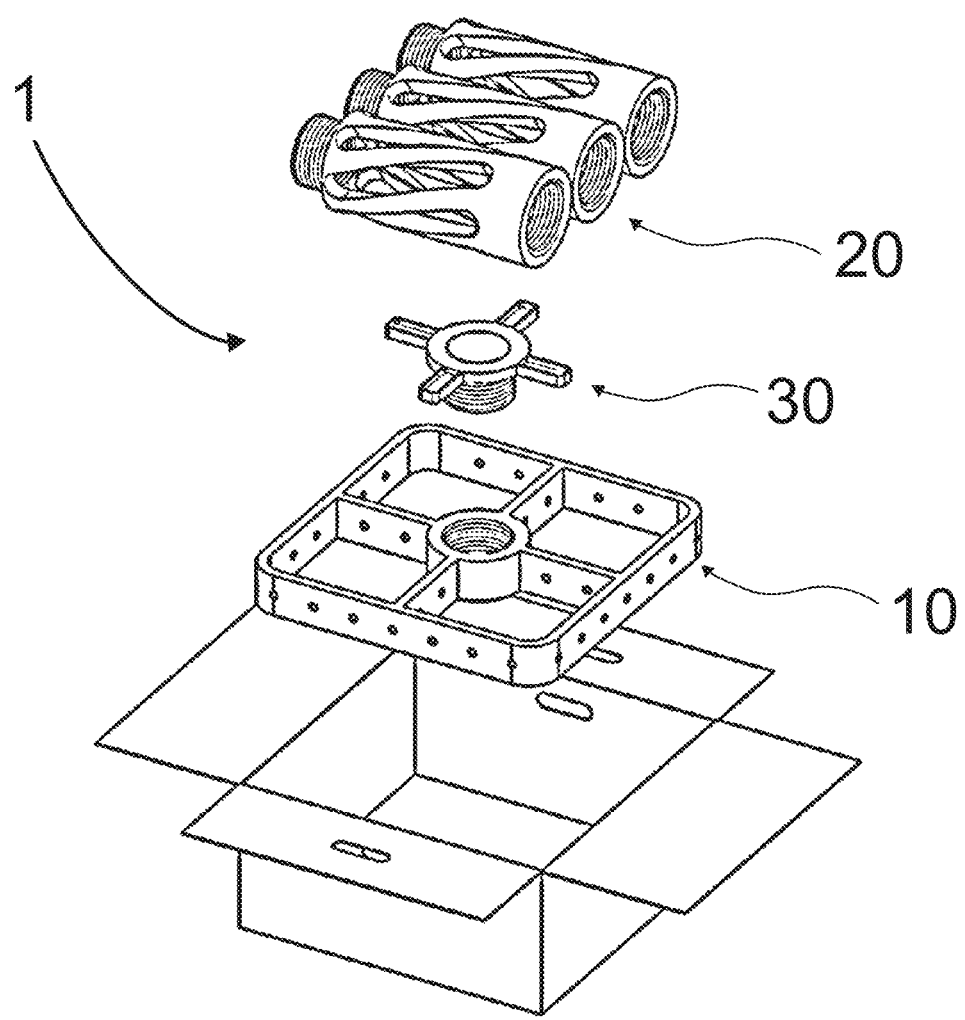
FIG. 11A is an exploded view of the trellis in a disassembled state being packed in a box according to the present invention.
Figure 11B:
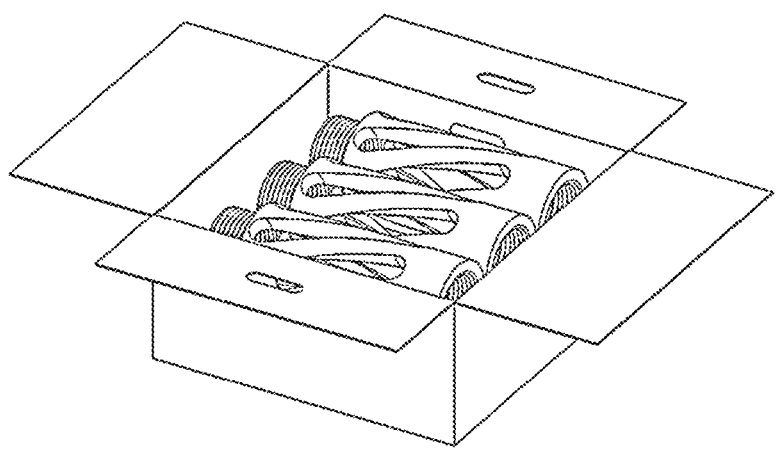
FIG. 11B is a perspective view of the trellis in a disassembled state packed in a box according to the present invention.

An exploded view of the trellis 1 with the small bottom base 30 in a disassembled state being packed in a box is shown in FIG. 11A and a perspective view of the boxed trellis 1 is shown in FIG. 11B. The top supporter 10 is placed in a box first. The small bottom base 30 is placed in the box on top of the top supporter 10. In order to create a more efficient use of space, the small bottom base 30 may be removably connected to the top supporter 10 within the box This removable connection may be a threaded connection. The plurality of pole portions 20 are placed in the box last. The plurality of pole portions 20 are placed side-by-side such that they are arranged in an optimal configuration for space efficiency in the box.

Figure 12A:
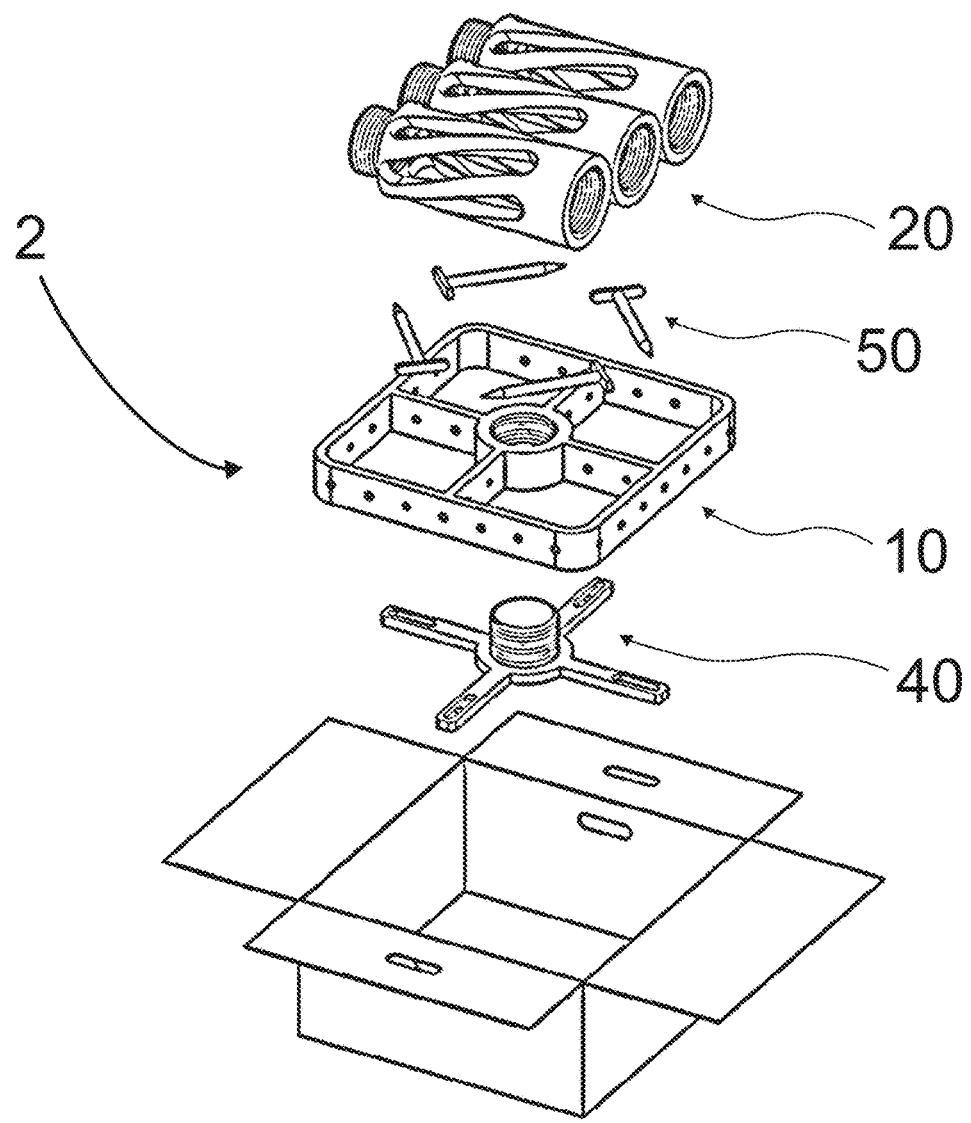
FIG. 12A is an exploded view of the trellis in a disassembled state being packed in a box according to the present invention.
Figure 12B:
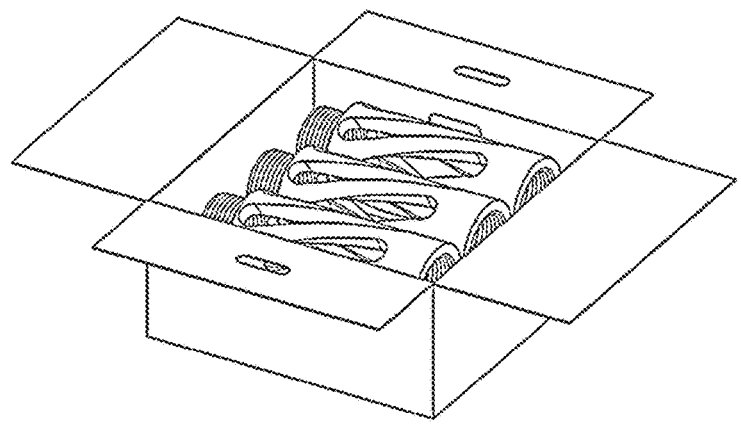
FIG. 12B is a perspective view of the trellis in a disassembled state packed in a box according to the present invention.

An exploded view of the trellis 2 with the large bottom base 40 in a disassembled state being packed in a box is shown in FIG. 12A and a perspective view of the trellis 2 is shown in FIG. 12B. The large bottom base 40 is placed in the box first. The top supporter 10 is placed in the box on top of the large bottom base 40. In order to create a more efficient use of space, the top supporter 10 may be removably connected to the large bottom base 40 within the box. This removable connection may be a threaded connection or interference-fit. The plurality of pole portions 20 are placed in the box last. The plurality of pole portions 20 are placed side-by-side such that they are arranged in an optimal configuration for space efficiency in the box. The T-nails 50 are placed in the box between the top supporter 10 and the plurality of pole portions 20.

Figure 13A:
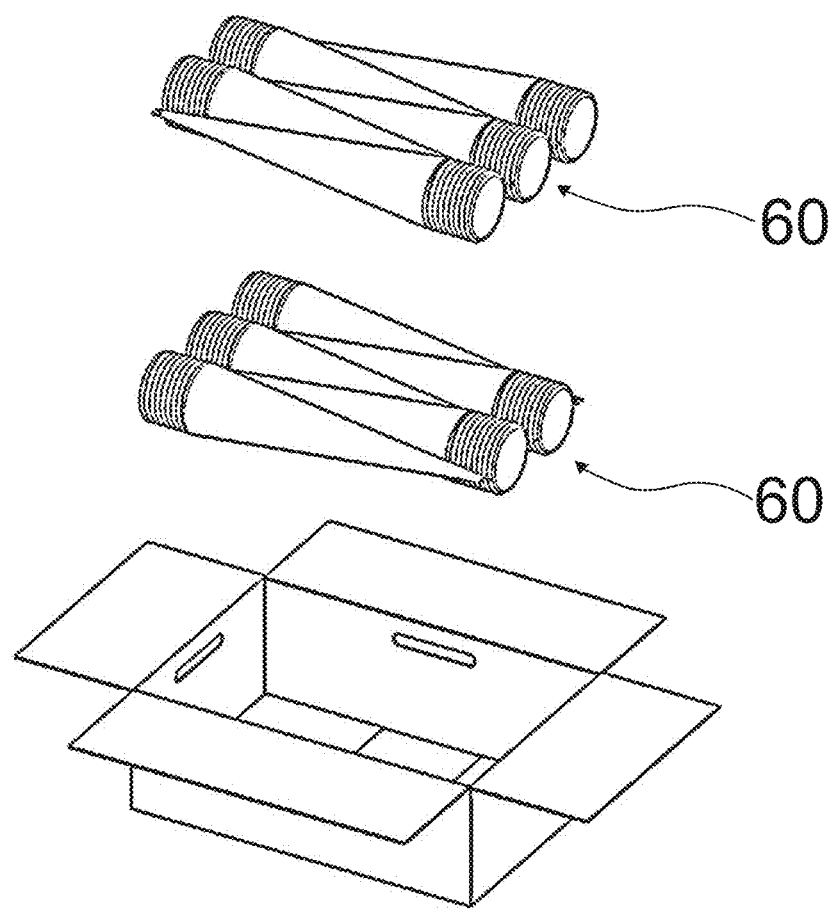
FIG. 13A is an exploded view of eight light poles of trellises being packed in a box according to the present invention.
Figure 13B:
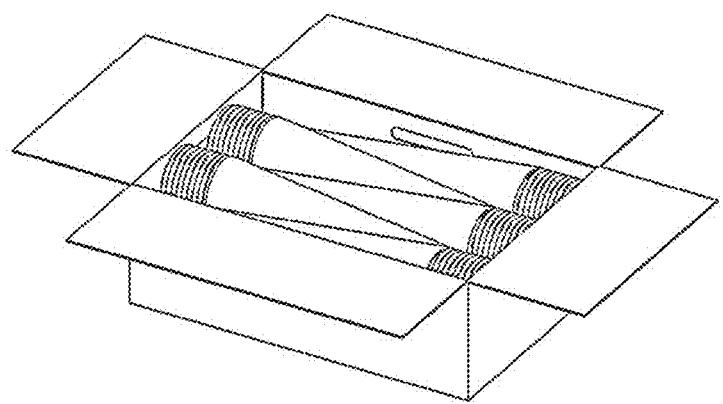
FIG. 13B is a perspective view of the light poles of the trellises packed in a box according to the present invention.

An exploded view of the light poles 60 being packed in a box is shown in FIG. 13A and a perspective view of the light poles 60 is shown in FIG. 13B. The light poles 60 are arranged such that a tapered cylinder bottom of one light pole is adjacent to a tapered cylinder top of an adjacent light pole, thereby creating an optimal configuration for space efficiency in the box. One pair of four light poles 60 is placed into the box first, and another pair of four light poles 60 is placed into the box on top of the first pair of four light poles 60.

Figure 14:
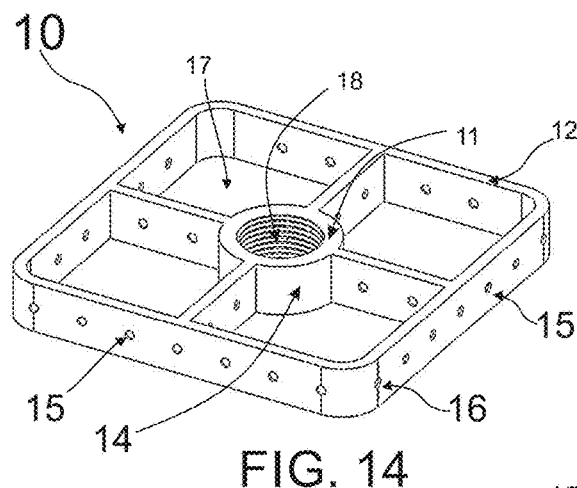
FIG. 14 is a top perspective view of a threaded top supporter of the trellis according to the present invention.
Figure 14A:
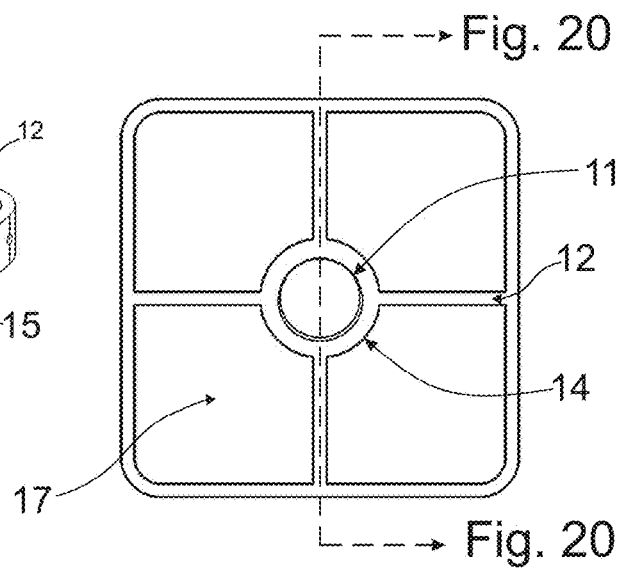
FIG. 14A is a top view of the threaded top supporter of the trellis according to the present invention.
Figure 14C:
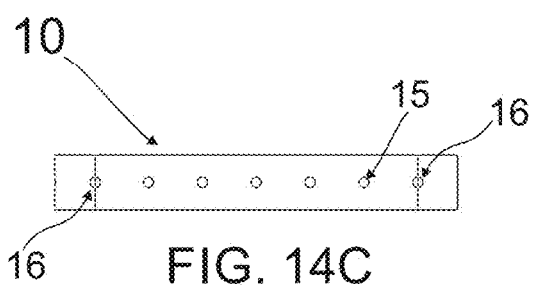
FIG. 14C is a side view of the threaded top supporter of the trellis according to the present invention.
Figure 14B:
FIG. 14B is a front view of the threaded top supporter of the trellis according to the present invention.
Figure 14E:
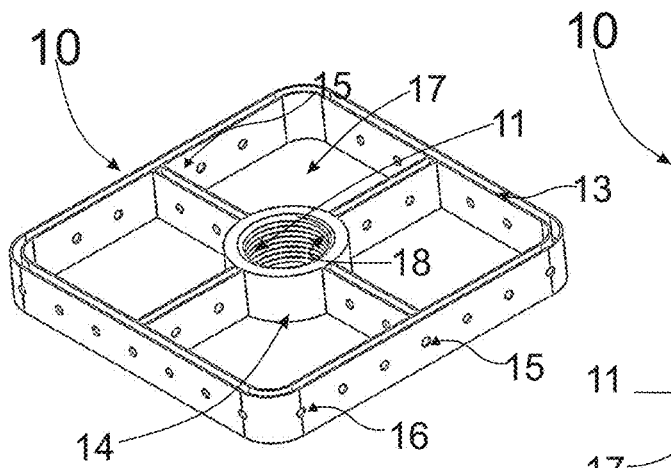
FIG. 14E is a bottom perspective view of the threaded top supporter of the trellis according to the present invention.
Figure 14D:
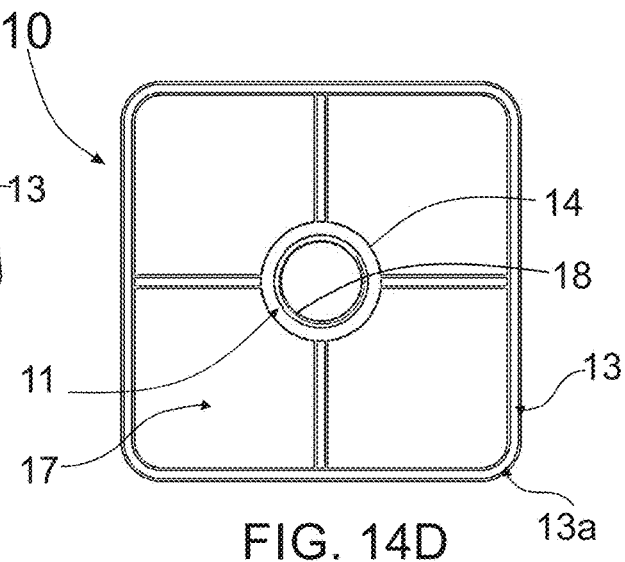
FIG. 14D is a bottom view of the threaded top supporter of the trellis according to the present invention.

A top perspective view of the top supporter 10 of the trellis 1 is shown in FIG. 14. A top view of the top supporter 10 is shown in FIG. 14A, a front view of the top supporter 10 is shown in FIG. 14B, a side view of the top supporter 10 is shown in FIG. 14C, a bottom view of the top supporter 10 is shown in FIG. 14D, and a bottom perspective view of the top supporter 10 is shown in FIG. 14E. A center support 11 is centered within the top supporter 10. A top surface 12 of the main supporter 10 is shown in FIGS. 14 and 14A, and a generally square perimeter 13 of the top supporter 10 having rounded corners 13a is shown in FIGS. 14D and 14E. The center support 11 includes an outer surface 14 and inside threads 18.

General holes 15 reside through the perimeter 13 of the top supporter 10. The general holes 15 may be used to reduce the weight of the top supporter 10. Corner holes 16 are also formed on rounded corners 13a of the perimeter 13 of the main supporter 10. The corner holes 16 may also be used to reduce the weight of the top supporter 10 as well as to accept the tubes 100 shown in FIG. 9. Four corner spaces 17 are formed between the middle cylinder 11 and the main supporter. The corner spaces 17 are empty spaces that serve to reduce the weight of the top supporter 10.

Figure 15:
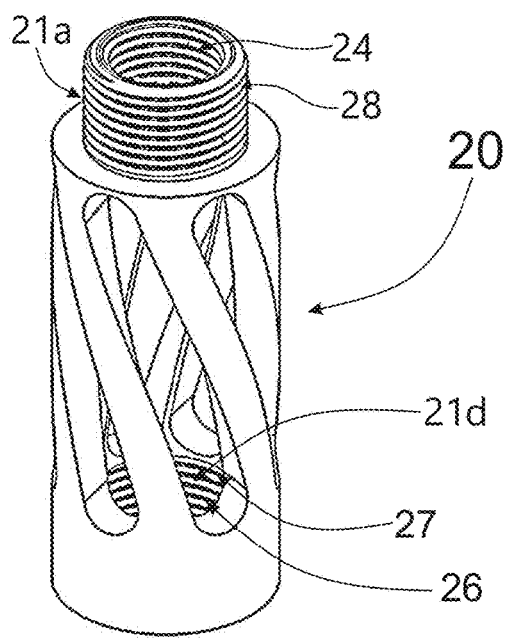
FIG. 15 is a top perspective view of a threaded pole portion of the trellis according to the present invention.
Figure 15A:
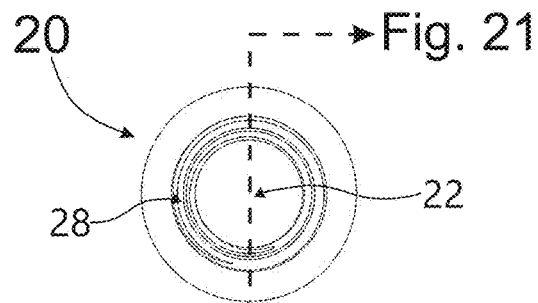
FIG. 15A is a top view of the threaded pole portion of the trellis according to the present invention.
Figures 15B, 15C:
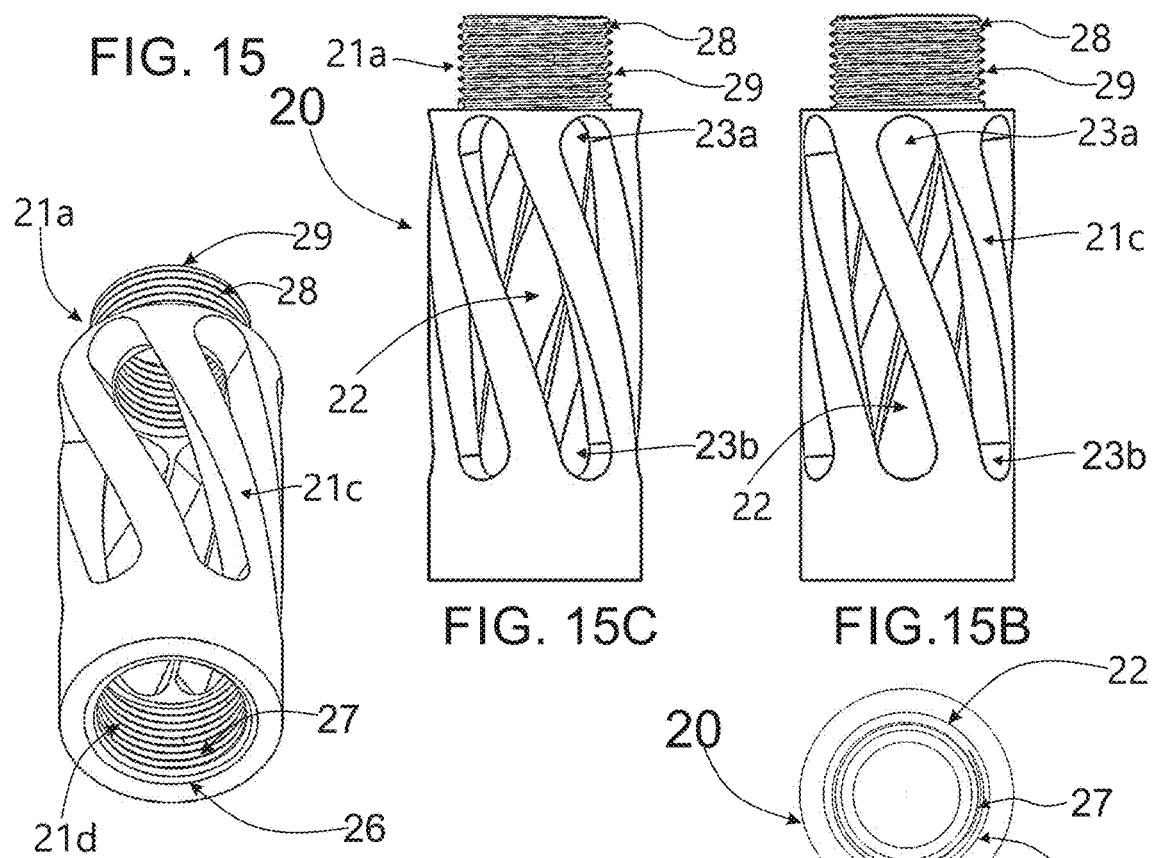
FIG. 15B is a front view of the threaded pole portion of the trellis according to the present invention.
FIG. 15C is a side view of the threaded pole portion of the trellis according to the present invention.
Figure 15E:
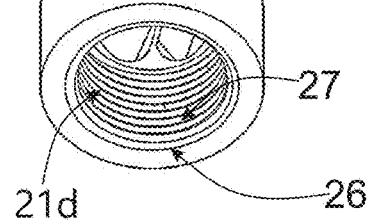
FIG. 15E is a bottom perspective view of the threaded pole portion of the trellis according to the present invention.
Figure 15D:
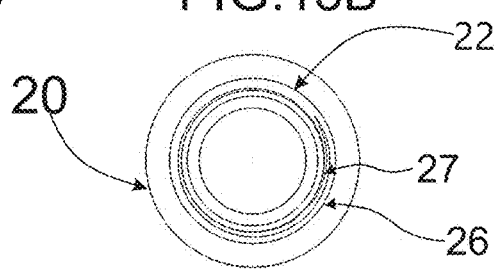
FIG. 15D is a bottom view of the threaded pole portion of the trellis according to the present invention.

A top perspective view of a pole portion 20 of a trellis is shown in FIG. 15. A top view of the pole portion 20 is shown in FIG. 15A, a front view of the pole portion 20 is shown in FIG. 15B, a side view of the pole portion 20 is shown in FIG. 15C, a bottom view of the pole portion 20 is shown in FIG. 15D, and a bottom perspective view of the pole portion 20 is shown in FIG. 15E. The pole portion 20 includes a threaded top connector 21a. The top connector 21a includes inside threads 24 which engage the light pole 60 and outside threads 25 which may engage either another pole section 20 or the top square supporter 10 (see FIG. 27C).

The pole portion 20 includes a body 22 including an exterior 22a that surrounds an interior 22b. The body 22 includes helical openings 23 having a top 23a and bottom 23b. The opening 23 may serve to reduce the weight of the pole portion 20. The helical openings 23 may allow for plants to grow up the plurality of pole portions 20 when the plurality of pole portions 20 are removably connected together as shown in FIGS. 1-10D. Some plants, such as dragon fruit plants, grow upwards in a helical pattern. Therefore, the helical openings 23 may allow for these plants to contact the middle outer cylinder 21c as the plants grow up the trellis. A stalk of a plant may be removably attached to the plurality of pole portions 20 via a removable connection method such as but not limited to tape, wire, or string.

The bottom of the pole portion 20 also includes inside threads 21d (also see FIG. 27D) opposite to the threaded top connector 21. In this configuration, a first pole portion may be threaded into a second pole portion by threading the threaded top connector 21 of the first pole portion into the bottom inside threads 21d of the second pole portion, thereby creating a removable connection between the two pole portions. This method of connection pole portions 20 may be expanded to create a pole from two or more pole portions, three or more pole portions, four or more pole portions, or any other number of pole portions.

Figure 16:
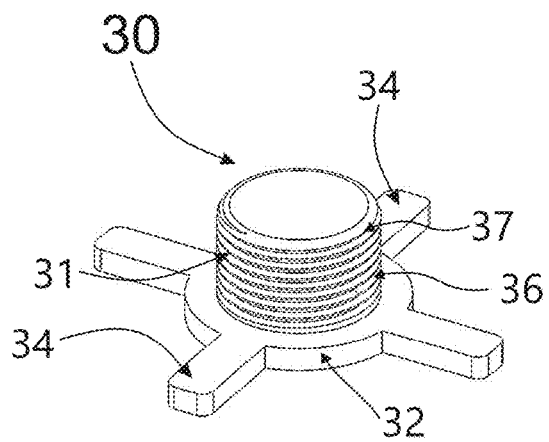
FIG. 16 is a top perspective view of a threaded small bottom base of the trellis according to the present invention.
Figure 16A:
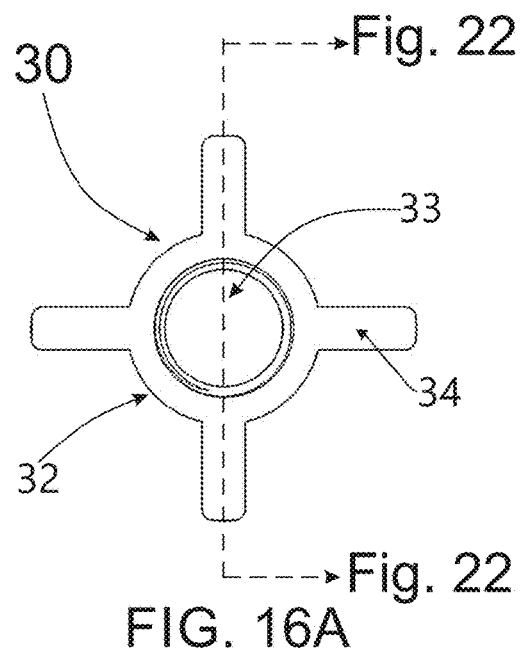
FIG. 16A is a top view of the threaded small bottom base of the trellis according to the present invention.
Figure 16C:
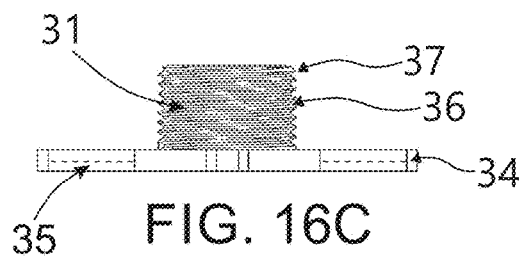
FIG. 16C is a side view of the threaded small bottom base of the trellis according to the present invention.
Figure 16B:
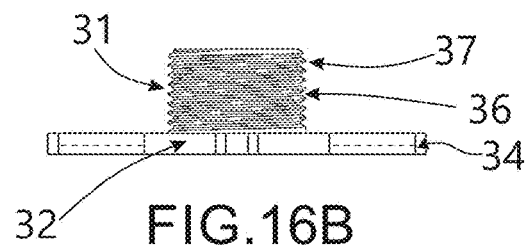
FIG. 16B is a front view of the threaded small bottom base of the trellis according to the present invention.
Figure 16E:
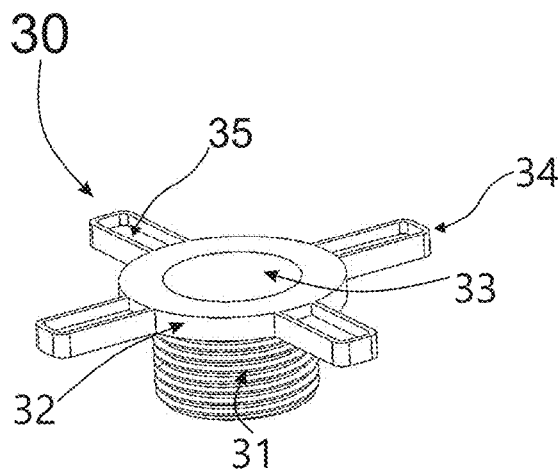
FIG. 16E is a bottom perspective view of the threaded small bottom base of the trellis according to the present invention.
Figure 16D:
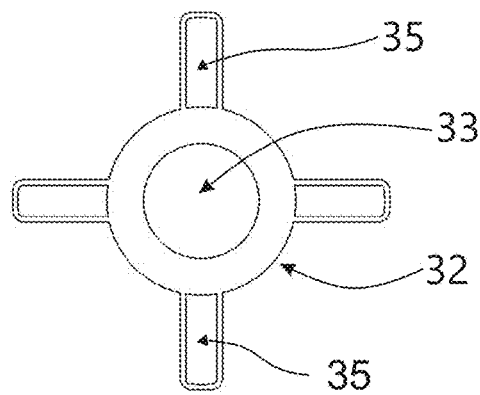
FIG. 16D is a bottom view of the threaded small bottom base of the trellis according to the present invention.

A top perspective view of a small bottom base 30 of a trellis is shown in FIG. 16. A top view of the small bottom base 30 is shown in FIG. 16A, a front view of the small bottom base 30 is shown in FIG. 16B, a side view of the small bottom base 30 is shown in FIG. 16C, a bottom view of the small bottom base 30 is shown in FIG. 16D, and a bottom perspective view of the small bottom base 30 is shown in FIG. 16E. The small bottom base 30 includes a top threads cylinder 31 (also see FIG. 28B) that includes outside threads engaging the inside threads 21d of the pole portion 20.

The small bottom base 30 also includes a bottom circular base 32 with an inner hollow cylinder 33. The inner hollow cylinder 33 of the bottom circular base 32 may serve to reduce the weight of the small bottom base 30. A plurality of wings 34 extend from the circular base 32. A hollow bottom chamber 35 extends into each of the plurality of wings 34. The hollow bottom chambers 35 may serve to reduce the weight of the small bottom base 30. Four rectangular wings 34 are shown in FIGS. 16-16E. This is not intended to limit the number of wings 34 to four, nor to limit the exact shape of the wings 34. The number of wings 34 may be three or more, four or more, five or more, or any other number of wings.

Figure 17:
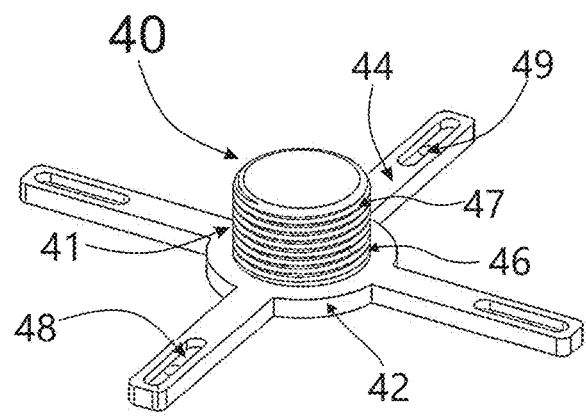
FIG. 17 is a top perspective view of a threaded large bottom base of the trellis according to the present invention.
Figure 17A:
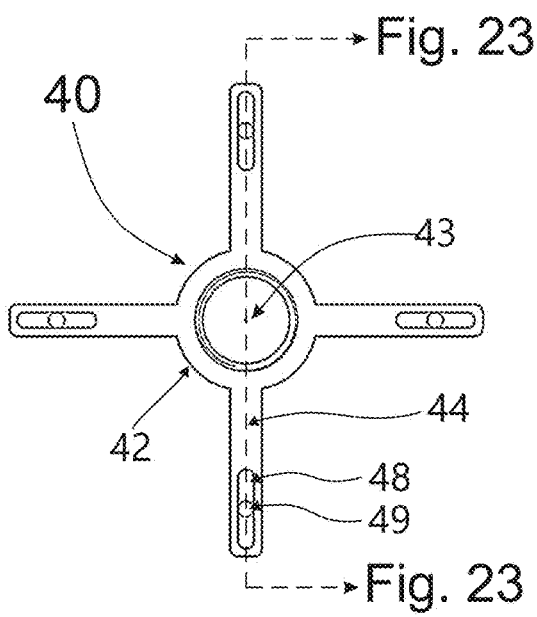
FIG. 17A is a top view of the threaded large bottom base of the trellis according to the present invention.
Figure 17C:
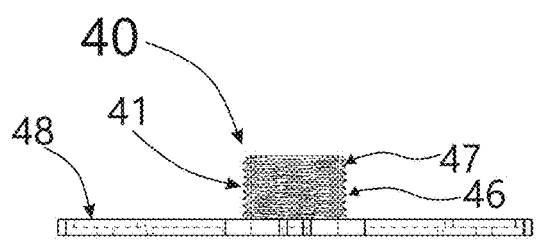
FIG. 17C is a side view of the threaded large bottom base of the trellis according to the present invention.
Figure 17B:
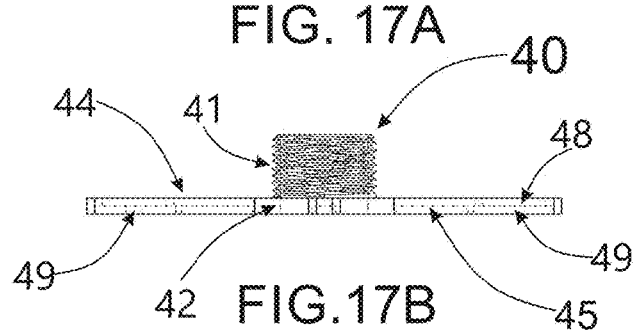
FIG. 17B is a front view of the threaded large bottom base of the trellis according to the present invention.
Figure 17E:
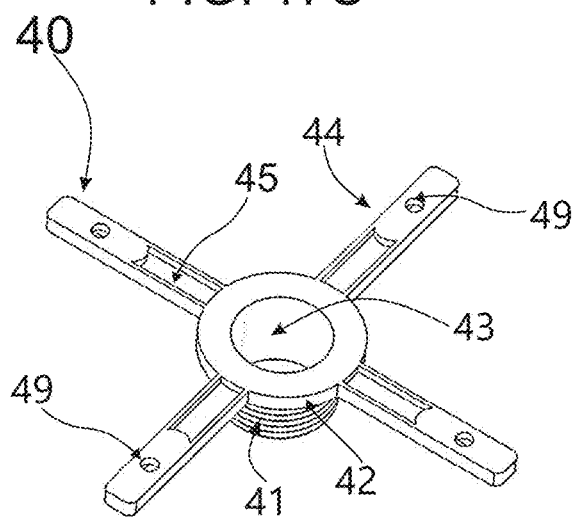
FIG. 17E is a bottom perspective view of the threaded large bottom base of the trellis according to the present invention.
Figure 17D:
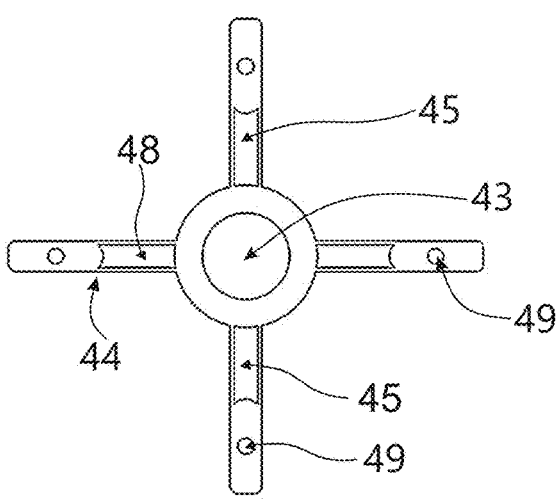
FIG. 17D is a bottom view of the threaded large bottom base of the trellis according to the present invention.

A top perspective view of a large bottom base 40 of a trellis is shown in FIG. 17. A top view of the large bottom base 40 is shown in FIG. 17A, a front view of the large bottom base 40 is shown in FIG. 17B, a side view of the large bottom base 40 is shown in FIG. 17C, a bottom view of the large bottom base 40 is shown in FIG. 17D, and a bottom perspective view of the large bottom base 40 is shown in FIG. 17E. The large bottom base 40 includes a top threads cylinder 41 (also see FIG. 29B) that includes outside threads engaging the inside threads 21d of the pole portion 20.

The large bottom base 40 also includes a bottom circular base 42 with an inner hollow cylinder 43. The inner hollow cylinder 43 of the bottom circular base 42 may serve to reduce the weight of the large bottom base 40. A plurality of wings 44 extend from the circular base 42. A hollow bottom chamber 45 extends into each of the plurality of wings 44. The hollow bottom chambers 45 may serve to reduce the weight of the large bottom base 40. Four rectangular wings 44 are shown in FIGS. 17-17E. This is not intended to limit the number of wings 44 to four, nor to limit the exact shape of the wings 44. The number of wings 44 may be three or more, four or more, five or more, or any other number of wings.

Each wing 44 includes a securing slot 48 and a securing hole 49. A T-nail 50 may be inserted through each securing hole 49 whereby a top securing bar 51 of the T-nail 50 may rest with in the securing chamber 48 to secure the large bottom base 40 to the ground.

A perspective view of a T-nail 50 of a trellis is shown in FIG. 18. A top view of the T-nail 50 is shown in FIG. 18A, a front view of the T-nail 50 is shown in FIG. 18B, and side view of the T-nail 50 is shown in FIG. 18C, and a bottom view of the T-nail 50 is shown in FIG. 18D. The top securing bar 51 resides at one end of a middle rod 52, and a pointed end 53 resides at an opposite end of the middle rod 52. When the T-nail is inserted through a securing hole 49 of a wing 44 of the large bottom base 40, the pointed end 53 may first be inserted through the securing hole 49 followed by the middle rod 52. The pointed end 53 and at least a portion of the middle rod 52 may be inserted into the ground, and the top securing bar 51 may reside within the securing chamber 48 of the wing 44 of the large bottom base 40. The T-nail 50 may serve to secure the large bottom base 40 to the ground to prevent the trellis from falling over.

A top perspective view of a light pole 60 of a trellis is shown in FIG. 19. A top view of the light pole 60 is shown in FIG. 19A, a front view of the light pole 60 is shown in FIG. 19B, a side view of the light pole 60 is shown in FIG. 19C, a bottom view of the light pole 60 is shown in FIG. 19D, and a bottom perspective view of the light pole 60 is shown in FIG. 19E. The light pole 60 comprises a tapered cylinder 62 with a tapered cylinder bottom 62a and a tapered cylinder top 62b opposite to the tapered cylinder bottom 62a. A top hook 67 reaches up from the tapered cylinder top 62b. The top hook 67 may serve to hold an electrical wire 80 to the light pole 60 as shown in FIG. 9. An outside threaded cylinder 61 resides under the tapered cylinder bottom 62a. The outside threaded cylinder 61 has outside threads comprising a minor diameter 64 and a major diameter 65 that correspond to the size of threads configured on the outer bottom threaded cylinder 61.

The outer bottom threaded cylinder 61 surrounds a bottom hollow cylinder 63. The bottom hollow cylinder 63 may serve to reduce the weight of the light pole 60. In addition to the bottom hollow cylinder 63, the tapered cylinder 62 of the light pole 60 may also be hollow to reduce the weight of the light pole 60. In these embodiments, the tapered cylinder 62 comprises an inner tapered hollow cylinder 66 with an inner tapered hollow cylinder bottom 66a and an inner tapered hollow cylinder top 66b.

Figure 20:
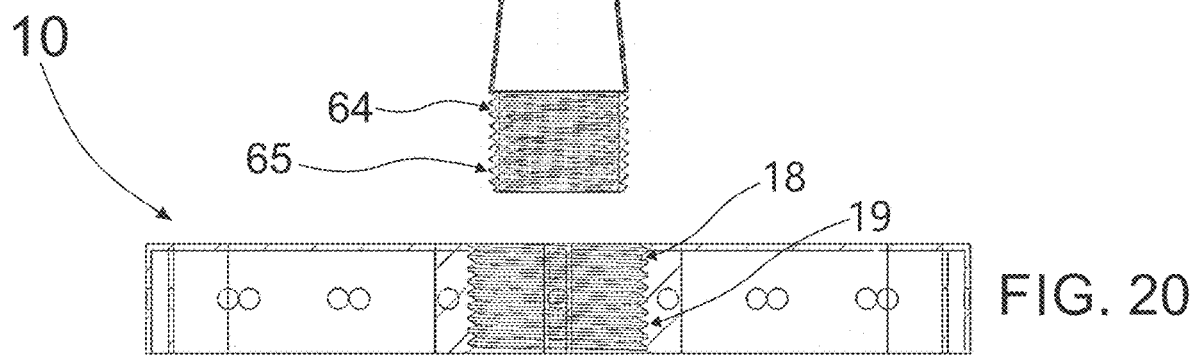
FIG. 20 is a cross-section view of the threaded top supporter of the trellis according to the present invention.

A cross-section view of the top supporter 10 is shown in FIG. 20. The middle cylinder 11 (see FIG. 14) of the top supporter 10 includes inside threads having a major diameter 18 and a minor diameter 19.

Figure 21:
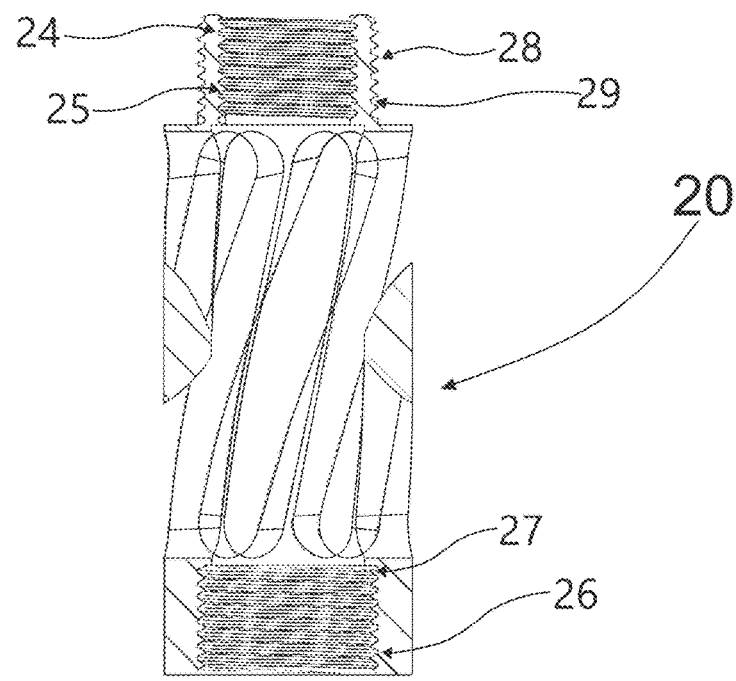
FIG. 21 is a cross-section view of a plurality of threaded pole portions of the trellis according to the present invention.

A cross-section view of a pole portion 20 is shown in FIG. 21. The top outer cylinder 21a (see FIG. 15) includes inside threads having a major diameter 24 and minor diameter 25 and outside threads having major diameter 28 and minor diameter 29. The bottom inner cylinder 21d (see FIG. 15E) includes inside threads having a major diameter 26 and a minor diameter 27.

Figure 22:
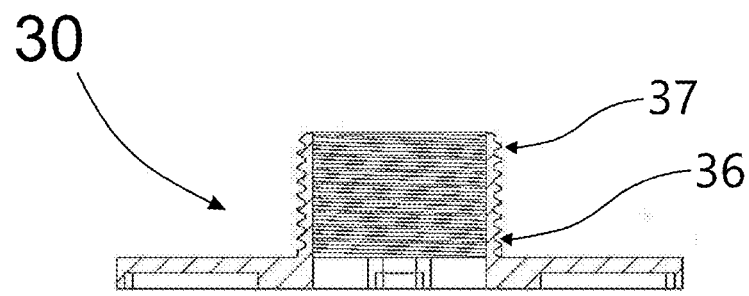
FIG. 22 is a cross-section view of the threaded small bottom base of the trellis according to the present invention.
Figure 23:
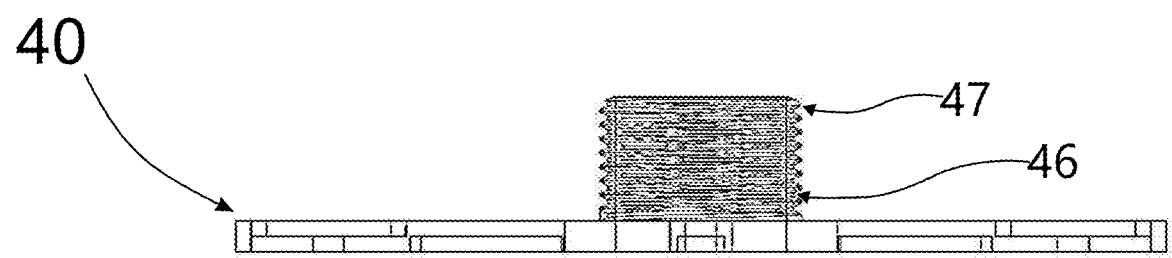
FIG. 23 is a cross-section view of the threaded large bottom base of the trellis according to the present invention.
Figure 24:
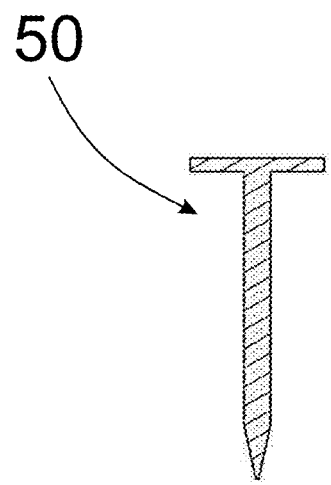
FIG. 24 is a cross-section view of a T-nail of the trellis according to the present invention.

A cross-section view of the small bottom base 30 is shown in FIG. 22. The top threads cylinder 31 (see FIG. 16) includes outside threads having a major diameter 37 and minor diameter 36. A cross-section view of the large bottom base 40 is shown in FIG. 23. The top threads cylinder 41 includes outside threads having a major diameter 47 and a minor diameter 46. A cross-section view of the T-nail 50 is shown in FIG. 24.

Figure 25:
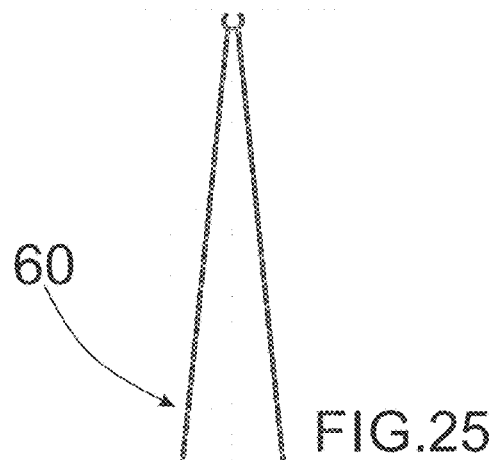
FIG. 25 is a cross-section view of the light pole of the trellis according to the present invention.

A cross-section view of the light pole 60 is shown in FIG. 25. The outer bottom threaded cylinder 61 of the light pole 60 has a major diameter 65 and a minor diameter 64 to threadedly cooperate with the inside threads of the top outer cylinder 21a of the pole portion 20.

The outside threads on the top outer cylinder 21a of each pole portion 20 may threadedly cooperate with the inside threads in the bottom inner cylinder 21d of the pole portion 20. The inside threads in the middle cylinder 11 of the top supporter 10 may removably mate with the outside threads on the top outer cylinder 21a of the pole portion 20. The outside threads on the outer bottom threaded cylinder 61 of the light pole 60 may threadedly cooperate with the outside threads on the top inner cylinder 21b of the pole portion 20. The threads extending from the top threads cylinder 31, 41 of the small bottom base 30 or the large bottom base 40, respectively, may removably mate with the threads extending into the bottom inner cylinder 21d of the bottom pole portion. In this manner, the trellis may be assembled and disassembled using threaded components.

Figure 26A:
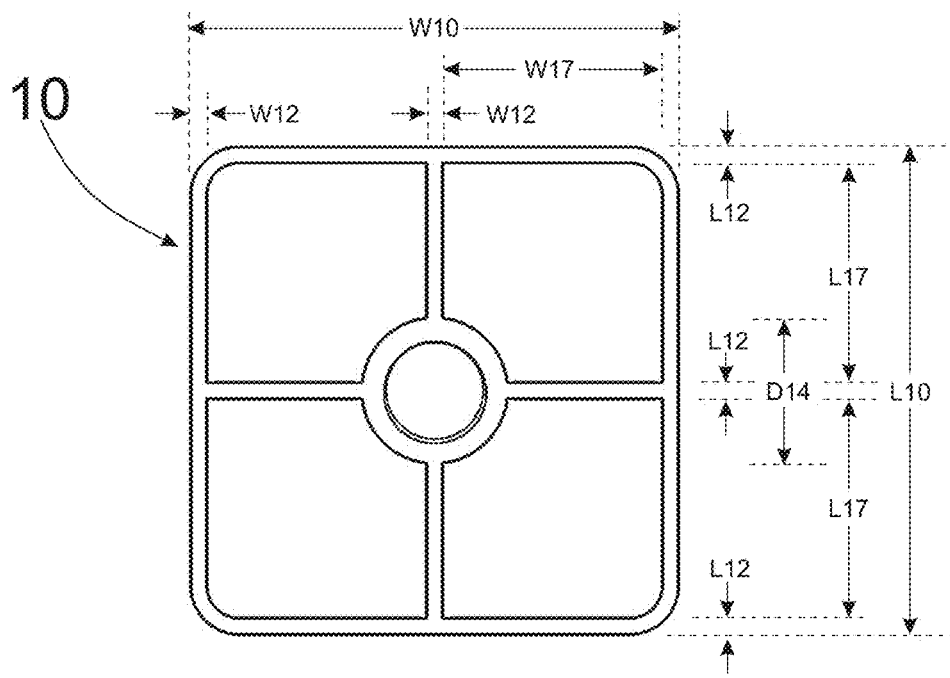
FIG. 26A is a dimensioned top view of the threaded top supporter of the trellis according to the present invention.
Figure 26B:
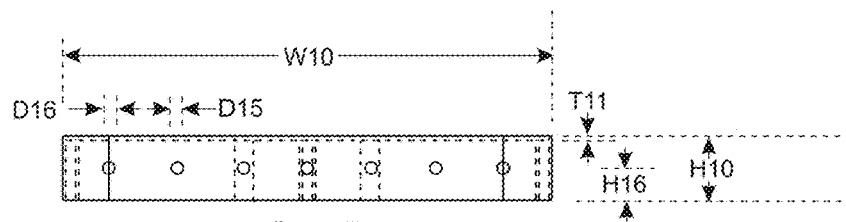
FIG. 26B is a dimensioned front view of the threaded top supporter of the trellis according to the present invention.
Figure 26C:
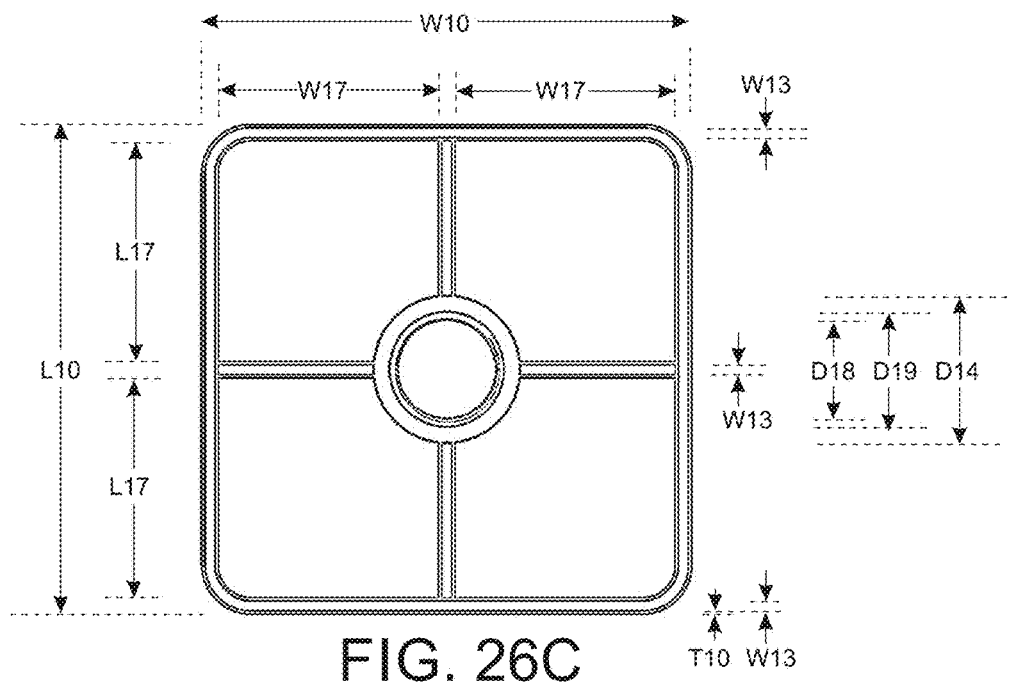
FIG. 26C is a dimensioned bottom view of the threaded top supporter of the trellis according to the present invention.

A dimensioned top view of a top supporter 10 is shown in FIG. 26A, a dimensioned front view of the top supporter 10 is shown in FIG. 26B, and a dimensioned bottom view of the top supporter 10 is shown in FIG. 26C. The top supporter 10 has an overall width W10, and overall length L10, and an overall height H10. A width W12 and length L12 define the thickness from front-to-back or from side-to-side of the supports that connect the middle cylinder 11 to the side supporter and form the corner spaces 17. A width W13 defines the thickness from front-to-back or from side-to-side of the underneath hollow channel 13. A thickness T10 defines the thickness from front-to-back or from side-to-side of the walls defining the underneath hollow channel 13. A thickness T11 defines the depth from bottom-to-top of the underneath hollow channel 13. Each of the corner spaces 17 has a width W17 and a length L17. The middle cylinder 11 has an outer diameter D14, an inner major diameter D19, and an inner minor diameter D18. A height H16 defines the distance from the top surface to the general holes 15 and the corner holes 16. The general holes 15 each have a diameter D15 and the corner holes 16 each have a diameter D16.

The length L10 and width W10 are both preferably between 24 in and 48 in, and more preferably are about 30 in, and most preferably are 30 in. The length L12 and width W12 are both preferably between ¾ in and 2 in, and more preferably are about 1 in, and most preferably are 1 in. The width W13 is preferably between ½ in and 1.5 in, and more preferably is about ⅝ in, and most preferably is ⅝ in. The length L17 and width W17 are both preferably between 10.875 in and 21 in, and more preferably are about 13.5 in, and most preferably are 13.5 in. The diameter D14 is preferably between 4 in and 12 in, and more preferably is about 9 in, and most preferably is 9 in. The diameters D15 and D16 are both preferably between ½ in and 1 in, and more preferably are about ¾ in, and most preferably are ¾ in. The diameter D18 is preferably between 3.01 in and 10.01 in, and more preferably is about 6.01 in, and most preferably is 6.01 in. The diameter D19 is preferably between 3.51 in and 10.51 in, and more preferably is about 6.51 in, and most preferably is 6.51 in. The height H10 is preferably between 2 in and 6 in, and more preferably is about 4 in, and most preferably is 4 in. The height H16 is preferably between 1 in and 3 in, and more preferably is about 2 in, and most preferably is 2 in. The thickness T10 is preferably between ⅛ in and ½ in, and more preferably is about 3⁄16 in, and most preferably is 3⁄16 in. The thickness T11 is preferably between 3⁄16 in and 1 in, and more preferably is about ¼ in, and most preferably is ¼ in.

A dimensioned top view of a pole portion 20 is shown in FIG. 27A, a dimensioned front view of the pole portion 20 is shown in FIG. 26B, a dimensioned cross-section view of the pole portion 20 is shown in FIG. 27C, and a dimensioned bottom view of the pole portion 20 is shown in FIG. 27D. The pole portion 20 has an overall diameter D20. The top outer cylinder 21a has a major diameter D29 and a minor diameter D28. The top inner cylinder 21b has a major diameter D24 and a minor diameter D25. The bottom inner cylinder 21d has a major diameter D26 and a minor diameter D27. The middle hollow cylinder 22 has a diameter D22.

The pole portion 20 has an overall height H20. The top inner cylinder 21b and top outer cylinder 21a share a height H21a. The middle hollow cylinder 22 has a height H22. The bottom inner cylinder 21d has a height H21d. The middle outer cylinder 21c has a height H21c. The perforated chamber 23 has a height H23 that extends the length of perforations configured in the middle hollow cylinder 22. Each perforation ends in a rounded end with a radius R23.

The diameter D20 is preferably between 4 in and 12 in, and more preferably is about 9 in, and most preferably is 9 in. The diameter D22 is preferably between 3.5 in and 9.5 in, and more preferably is about 5.5 in, and most preferably is 5.5 in. The diameter D24 is preferably between 3.01 in and 9.01 in, and more preferably is about 5.01 in, and most preferably is 5.01 in. The diameter D25 is preferably between 2.51 in and 8.51 in, and more preferably is about 4.51 in, and most preferably is 4.51 in. The diameter D26 is preferably between 3.51 in and 10.51 in, and more preferably is about 6.51 in, and most preferably is 6.01 in. The diameter D27 is preferably between 3.01 in and 10.01 in, and more preferably is about 6.01 in, and most preferably is 6.01 in. The diameter D28 is preferably between 3.in and 10 in, and more preferably is about 6 in, and most preferably is 6 in. The diameter D29 is preferably between 3.5 in and 10.5 in, and more preferably is about 6.5 in, and most preferably is 6.5 in. The radius R23 is preferably between 1 in and 1.75 in, and more preferably is about 1.25 in, and most preferably is 1.25 in.

The height H20 is preferably between 18 in and 26 in, and more preferably is about 24 in, and most preferably is 24 in. The heights H21a and H21c are both preferably between 3 in and 6 in, and more preferably are about 4 in, and most preferably are 4 in. The height H21c is preferably between 15 in and 22 in, and more preferably is about 20 in, and most preferably is 20 in. The height H22 is preferably between 12 in and 20 in, and more preferably is about 16 in, and most preferably is 16 in. The height H23 is preferably between 11.5 in and 19.5 in, and more preferably is about 15.5 in, and most preferably is 15.5 in.

Figure 28A:
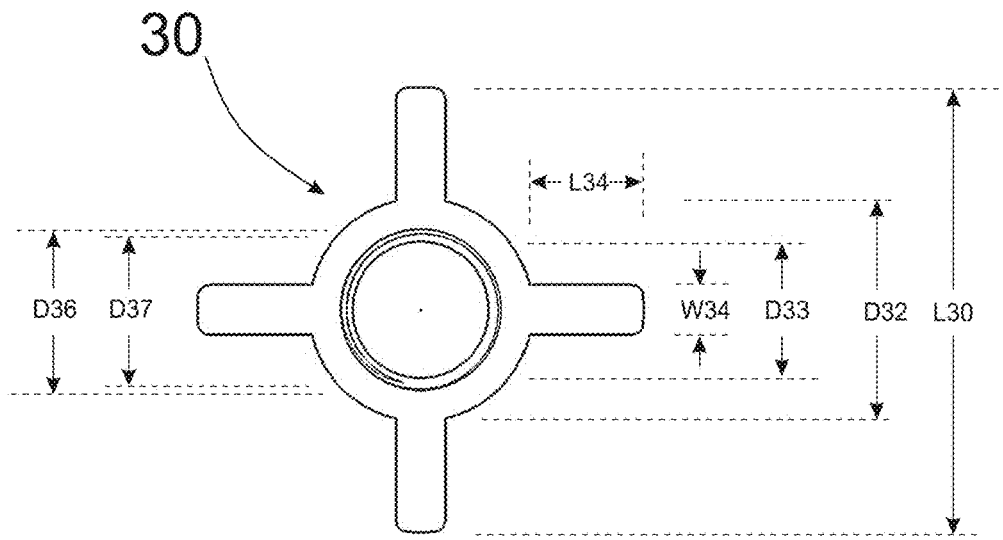
FIG. 28A is a dimensioned top view of the threaded small bottom base of the trellis according to the present invention.
Figure 28B:
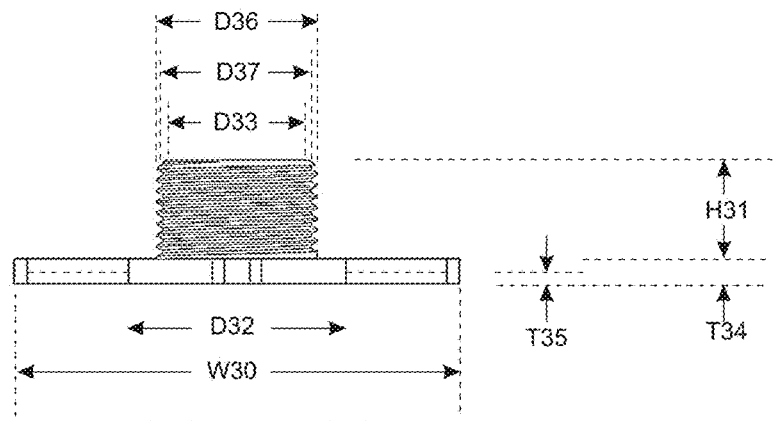
FIG. 28B is a dimensioned front view of the threaded small bottom base of the trellis according to the present invention.
Figure 28C:
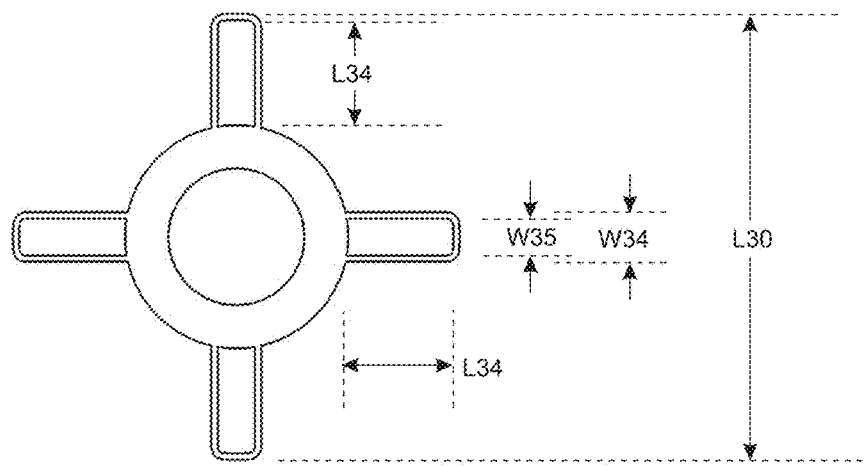
FIG. 28C is a dimensioned bottom view of the threaded small bottom base of the trellis according to the present invention.

A dimensioned top view of the small bottom base 30 is shown in FIG. 28A, a dimensioned front view of the small bottom base 30 is shown in FIG. 28B, and a dimensioned bottom view of the small bottom base 30 is shown in FIG. 28C. The small bottom base 30 has an overall length L30 and an overall width W30. The bottom circular base 32 has a diameter D32. The inner hollow cylinder 33 has a diameter D33. The top threads cylinder 31 has a major diameter D36 and a minor diameter D37. Each wing 34 has a length L34, a width W34, and a thickness T34. Each hollow bottom chamber 35 has a width W35 and a thickness T35.

The length L30 and width W30 are both preferably between 16 in and 18 in, and more preferably are about 18 in, and most preferably are 18 in. The diameter D32 is preferably between 4 in and 12 in, and more preferably is about 9 in, and most preferably is 9 in. The diameter D33 is preferably between 3 in and 9.5 in, and more preferably is about 5.5 in, and most preferably is 5.5 in. The diameter D36 is preferably between 3.5 in and 10.5 in, and more preferably is about 6.5 in, and most preferably is 6.5 in. The diameter D37 is preferably between 3 in and 10 in, and more preferably is about 6 in, and most preferably is 6 in. The width W34 is preferably between 2 in and 4 in, and more preferably is about 2 in, and most preferably is 2 in. The width W35 is preferably between 1.5 in and 3.5 in, and more preferably is about 1.5 in, and most preferably is 1.5 in. The length L34 is preferably between 2 in and 4.5 in, and more preferably is about 4.5 in, and most preferably is 4.5 in. The thickness T34 is preferably between ½ in and 2 in, and more preferably is about 1 in, and most preferably is 1 in. The thickness T35 is preferably between ¼ in and 1 in, and more preferably is about ½ in, and most preferably is ½ in.

Figure 29A:
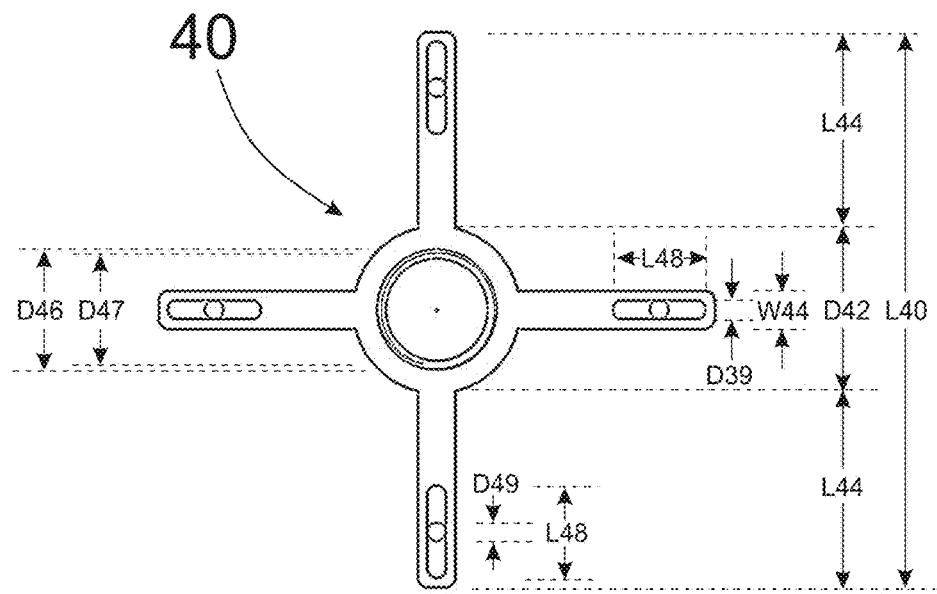
FIG. 29A is a dimensioned top view of the threaded large bottom base of the trellis according to the present invention.
Figure 29B:
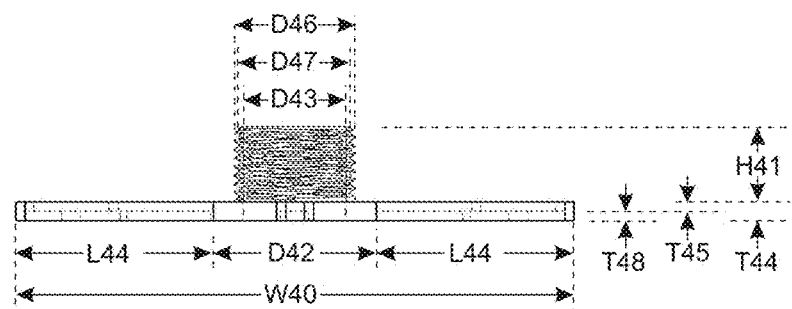
FIG. 29B is a dimensioned front view of the threaded large bottom base of the trellis according to the present invention.
Figure 29C:
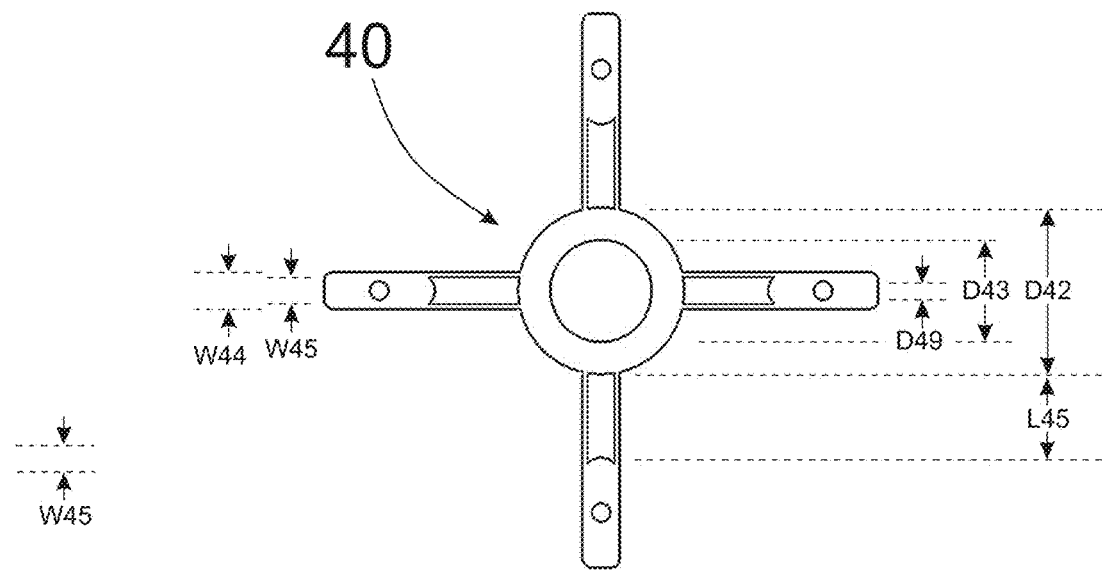
FIG. 29C is a dimensioned bottom view of the threaded large bottom base of the trellis according to the present invention.

A dimensioned top view of the large bottom base 40 is shown in FIG. 29A, a dimensioned front view of the large bottom base 40 is shown in FIG. 29B, and a dimensioned bottom view of the large bottom base 40 is shown in FIG. 29C. The large bottom base 40 has an overall length L40 and an overall width W40. The bottom circular base 42 has a diameter D42. The inner hollow cylinder 43 has a diameter D43. The top threads cylinder 41 has a major diameter D46 and a minor diameter D47. Each wing 44 has a length L44, a width W44, and a thickness T44. Each hollow bottom chamber 45 has a width W45 and a thickness T48. Each securing chamber 48 has a thickness T45 that defines the depth of the securing chamber. Each hole 49 has a diameter D49.

The length L40 and width W40 are both preferably between 24 in and 48 in, and more preferably are about 30 in, and most preferably are 30 in. The diameter D42 is preferably between 4 in and 12 in, and more preferably is about 9 in, and most preferably is 9 in. The diameter D43 is preferably between 2.5 in and 9.5 in, and more preferably is about 5.5 in, and most preferably is 5.5 in. The diameter D46 is preferably between 3.5 in and 10.5 in, and more preferably is about 6.5 in, and most preferably is 6.5 in. The diameter D47 is preferably between 3 in and 10 in, and more preferably is about 6 in, and most preferably is 6 in. The diameter D49 is preferably between 1 in and 2 in, and more preferably is about 1 in, and most preferably is 1 in. The width W44 is preferably between 2 in and 4 in, and more preferably is about 2 in, and most preferably is 2 in. The width W45 is preferably between 1.5 in and 3.5 in, and more preferably is about 1.5 in, and most preferably is 1.5 in. The length L44 is preferably between 6 in and 18 in, and more preferably is about 10.5 in, and most preferably is 10.5 in. The thickness T44 is preferably between 1 in and 2 in, and more preferably is about 1 in, and most preferably is 1 in. The thickness T45 is preferably between ½ in and 1 in, and more preferably is about ½ in, and most preferably is ½ in.

Figure 30A:
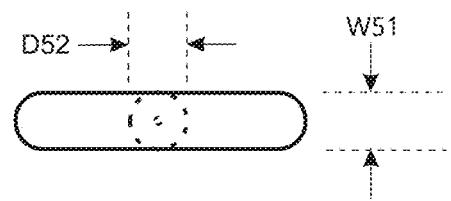
FIG. 30A is a dimensioned top view of a T-nail of the trellis according to the present invention.
Figure 30C:
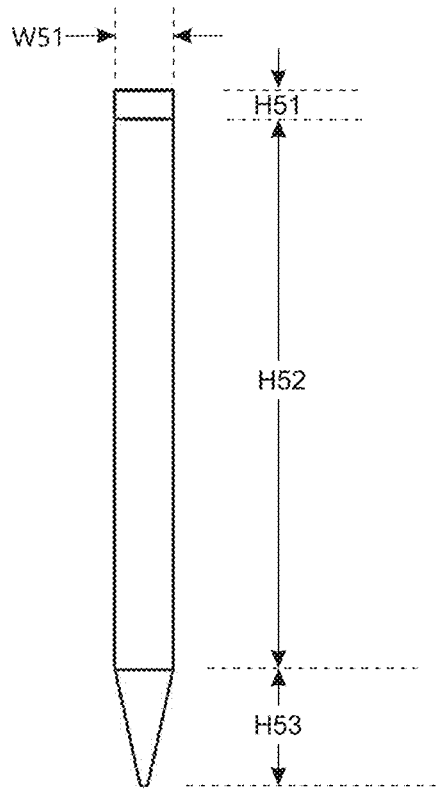
FIG. 30C is a dimensioned side view of the T-nail of the trellis according to the present invention.
Figure 30B:
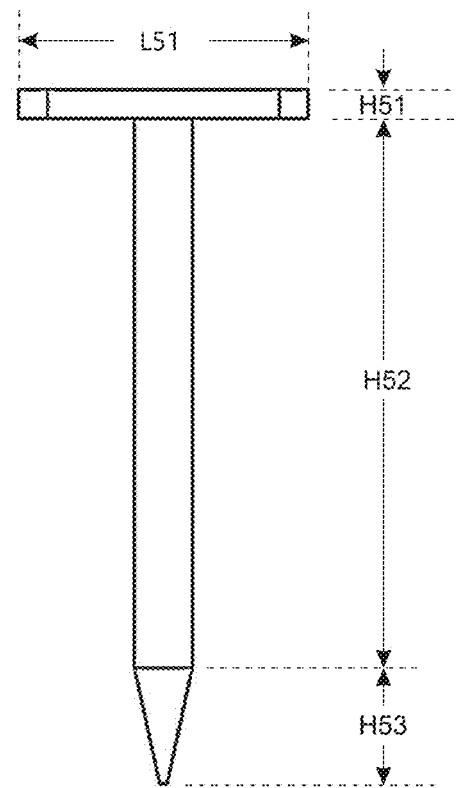
FIG. 30B is a dimensioned front view of the T-nail of the trellis according to the present invention.
Figure 30D:
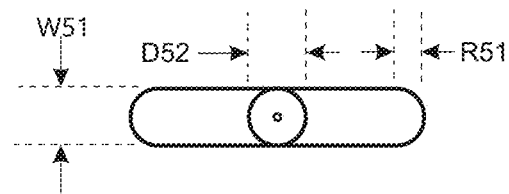
FIG. 30D is a dimensioned bottom view of the T-nail of the trellis according to the present invention.

A dimensioned top view of a T-nail 50 is shown in FIG. 30A, a dimensioned front view of the T-nail 50 is shown in FIG. 30B, a dimensioned side view of the T-nail 50 is shown in FIG. 30C, and a dimensioned bottom view of the T-nail 50 is shown in FIG. 30D. The top securing bar 51 has a width W51, a length L51, and a height H51. The ends of the top securing bar 51 are rounded and each have a radius R51. The middle rod 52 extends a height H52 from the top securing bar 51. The pointed end 53 extends a height H53 from the middle rod 52. The middle rod 52 has a diameter D52. The diameter D52 is preferably between 1 in and 2 in, and more preferably is about 1 in, and most preferably is 1 in. The radius R51 is preferably between ½ in and 1 in, and more preferably is about ½ in, and most preferably is 1 in. The length L51 is preferably between 2 in and 6 in, and more preferably is about 4 in, and most preferably is 4 in. The height H51 is preferably between ½ in and 1 in, and more preferably is about ½ in, and most preferably is ½ in. The height H52 is preferably between 6.5 in and 12.5 in, and more preferably is about 9.5 in, and most preferably is 9.5 in. The height H53 is preferably between 1 in and 3 in, and more preferably is about 2 in, and most preferably is 2 in. The width W51 is preferably between 1 in and 1.5 in, and more preferably is about 1 in, and most preferably is 1 in.

A dimensioned top view of the light pole 60 is shown in FIG. 31A, a dimensioned front view of the light pole 60 is shown in FIG. 31B, a dimensioned side view of the light pole 60 is shown in FIG. 31C, and a dimensioned bottom view of the light pole 60 is shown in FIG. 31D. The tapered cylinder 62 has a bottom diameter D61, a top diameter D62b, and a height H62. The outer bottom threaded cylinder 61 has a major diameter D65, a minor diameter D64, and a height H61. The top hook 67 has a height H67. The top hook 67 is formed as two prongs forming a partial circle with a radius R67. The bottom hollow cylinder 63 has a diameter D63, which also may be the bottom diameter of the inner tapered hollow cylinder 66. The inner tapered hollow cylinder 66 has a top diameter D67. A wall thickness T62 separates the inner tapered hollow cylinder from the outer surface of the tapered cylinder 62.

The diameter D61 is preferably between 2.5 in and 9.5 in, and more preferably is about 5.5 in, and most preferably is 5.5 in. The diameter D62b is preferably between ¼ in and ½ in, and more preferably is about ¼ in, and most preferably is ¼ in. The diameter D63 is preferably between 2.375 in and 9.125 in, and more preferably is about 5.125 in, and most preferably is 5.125 in. The diameter D64 is preferably between 2.5 in and 8.5 in, and more preferably is about 4.5 in, and most preferably is 4.5 in. The diameter D65 is preferably between 3 in and 9 in, and more preferably is about 5 in, and most preferably is 5 in. The diameter D67 is preferably between ⅛ in and ¼ in, and more preferably is about ⅛ in, and most preferably is ⅛ in. The radius R67 is preferably between ¼ in and 1 in, and more preferably is about 7/16 in, and most preferably is 7/16 in. The height H61 is preferably between 3 in and 6 in, and more preferably is about 4 in, and most preferably is 4 in. The height H62 is preferably between 18 in and 36 in, and more preferably is about 24 in, and most preferably is 24 in. The height H67 is preferably between ½ in and 1 in, and more preferably is about ½ in, and most preferably is ½ in. The thickness T62 is preferably between 3/16 in and ½ in, and more preferably is about 3/16 in, and most preferably is 3/16 in.

Figures 32, 33:
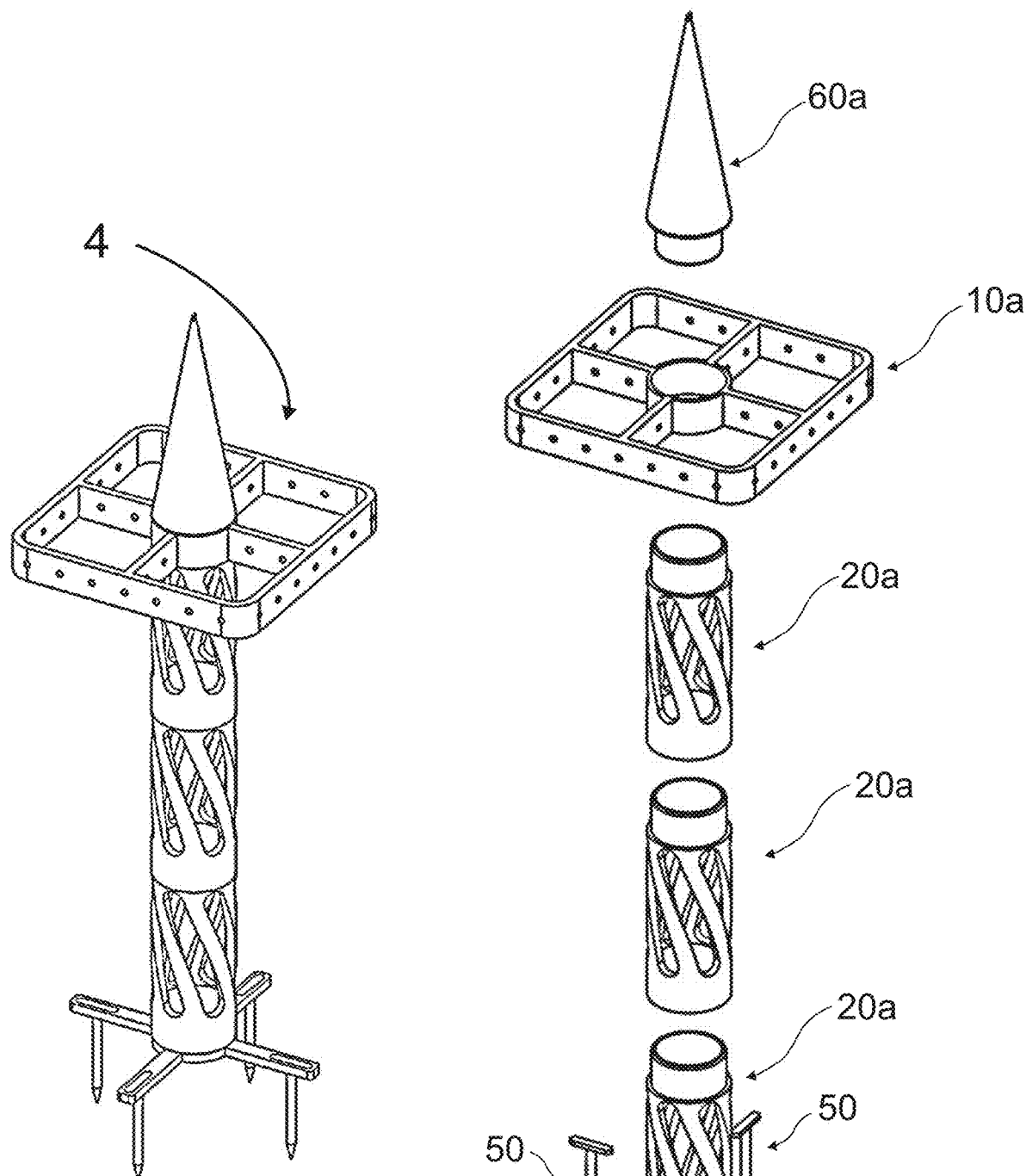
FIG. 32 is a perspective view of a trellis with interference-fit connections according to the present invention.
FIG. 33 is an exploded perspective view of the trellis with interference-fit connections according to the present invention.

A perspective view of a trellis 4 with interference-fit connections and a large bottom base is shown in FIG. 32 and an exploded view of the trellis 4 is shown in FIG. 33. A top supporter 10a is fit onto a plurality of pole portions 20a. Each of the plurality of pole portions 20a are fit into one another to create a pole onto which the top supporter 10a is fit. A large bottom base 40a is fit into the plurality of pole portions 20a opposite the top supporter 10a.

Figure 34:
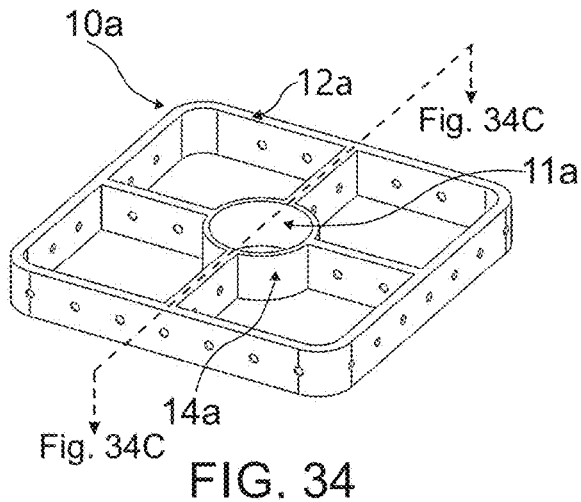
FIG. 34 is a top perspective view of an interference-fit top supporter of the trellis according to the present invention.
Figure 34A:
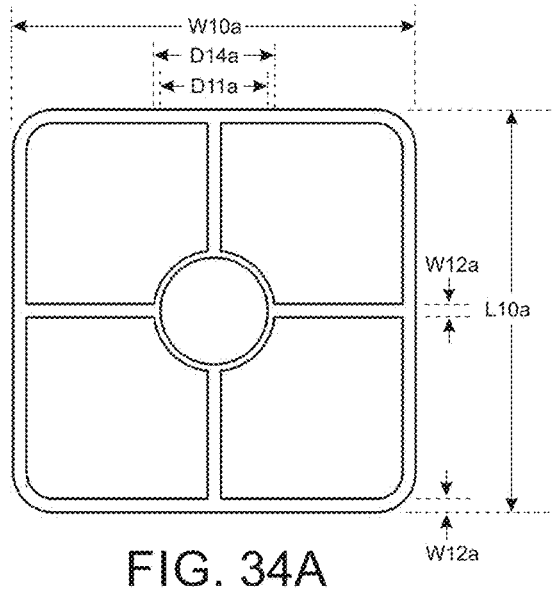
FIG. 34A is a dimensioned top view of the interference-fit top supporter of the trellis according to the present invention.
Figure 34C:
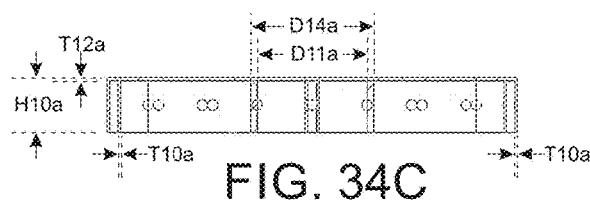
FIG. 34C is a dimensioned cross-sectional view of the interference-fit top supporter of the trellis according to the present invention.
Figure 34B:
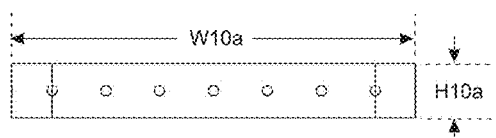
FIG. 34B is a dimensioned front view of the interference-fit top supporter of the trellis according to the present invention.
Figure 34E:
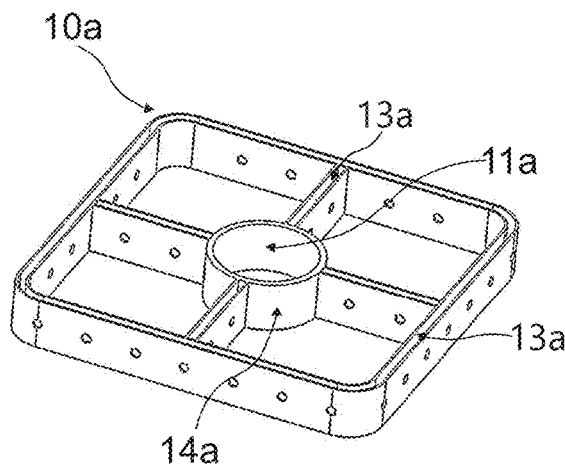
FIG. 34E is a bottom perspective view of the interference-fit top supporter of the trellis according to the present invention.
Figure 34D:
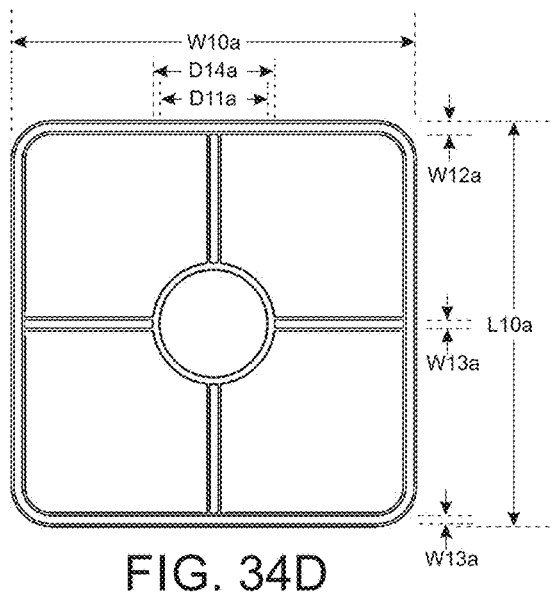
FIG. 34D is a dimensioned bottom view of the interference-fit top supporter of the trellis according to the present invention.

A top perspective view of a top supporter 10a is shown in FIG. 34. A dimensioned top view of the top supporter 10a is shown in FIG. 34A, a dimensioned front view of the top supporter 10a is shown in FIG. 34B, a dimensioned cross-sectional view of the top supporter 10a is shown in FIG. 34C, and a dimensioned bottom view of the top supporter 10a is shown in FIG. 34D. A bottom perspective view of the top supporter 10a is shown in FIG. 34E. A middle cylinder 11a is surrounded by a main supporter except for on two opposing sides of the middle cylinder 11a that correspond with a top of the top supporter and a bottom of the top supporter. A top surface 12a of the main supporter is shown in FIGS. 34 and 34A, and an underneath hollow channel 13a of the main supporter is shown in FIGS. 34D and 34E. The middle cylinder 11a comprises an outer surface 14a and an inner surface. Neither the outer surface 14a nor the inner surface are threaded since the top supporter 10a is removably connected to other components using a interference-fit connection.

The top supporter 10a has an overall width W10a, and overall length L10a, and an overall height H10a. A width W12a defines the thickness from front-to-back or from side-to-side of the supports that connect the middle cylinder 11a to the side supporter and form the corner spaces 17. A width W13a defines the thickness from front-to-back or from side-to-side of the underneath hollow channel 13a. A thickness T10a defines the thickness from front-to-back or from side-to-side of the walls defining the underneath hollow channel 13a. A thickness T12a defines the depth from bottom-to-top of the underneath hollow channel 13a. The middle cylinder 11a has an outer diameter D14a and an inner diameter D11a.

The length L10a and width W10a are both preferably between 24 in and 48 in, and more preferably are about 30 in, and most preferably are 30 in. The width W12a is preferably between ¾ in and 2 in, and more preferably is about 1 in, and most preferably is 1 in. The width W13a is preferably between ½ in and 1.5 in, and more preferably is about ⅝ in, and most preferably is ⅝ in. The diameter D14a is preferably between 4 in and 12 in, and more preferably is about 9 in, and most preferably is 9 in. The diameter D11a is preferably between 3.51 in and 10.51 in, and more preferably is about 6.51 in, and most preferably is 6.51 in. The height H10a is preferably between 2 in and 6 in, and more preferably is about 4 in, and most preferably is 4 in. The thickness T10a is preferably between ⅛ in and ½ in, and more preferably is about 3/16 in, and most preferably is 3/16 in. The thickness T12a is preferably between 3/16 in and ¾ in.

Figure 35:
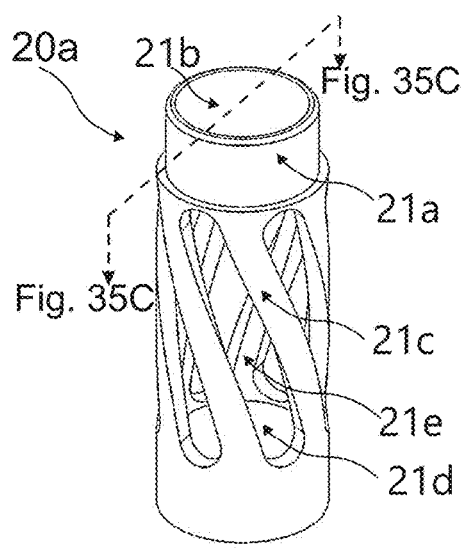
FIG. 35 is a top perspective view of an interference-fit pole portion of the trellis according to the present invention.
Figure 35A:
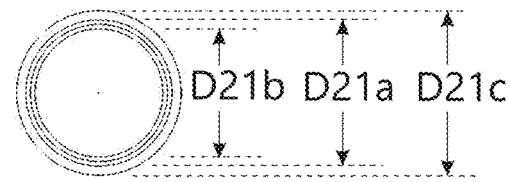
FIG. 35A is a dimensioned top view of the interference-fit pole portion of the trellis according to the present invention.
Figure 35C:
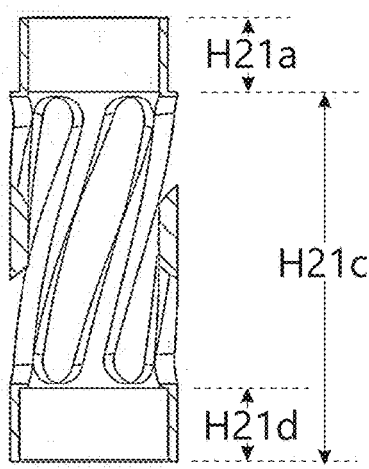
FIG. 35C is a dimensioned cross-sectional view of the interference-fit pole portion of the trellis according to the present invention.
Figure 35B:
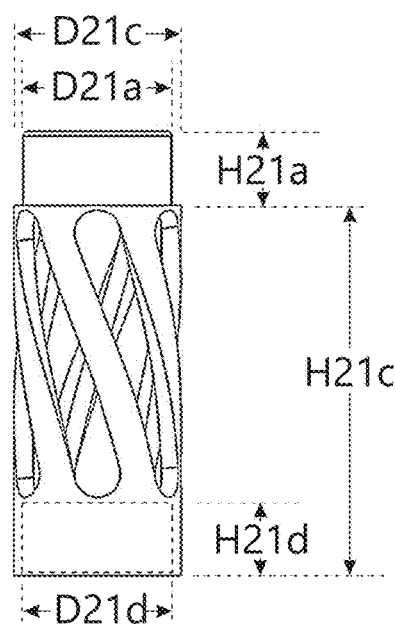
FIG. 35B is a dimensioned front view of the interference-fit pole portion of the trellis according to the present invention.
Figure 35E:
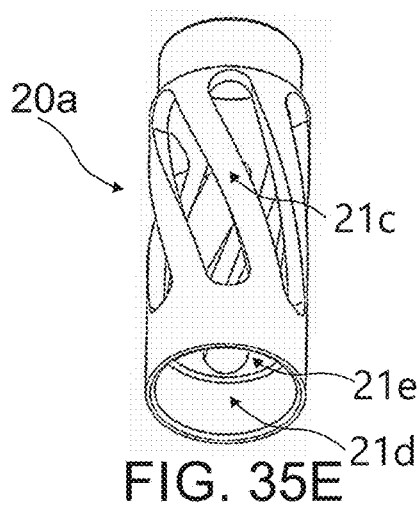
FIG. 35E is a bottom perspective view of the interference-fit pole portion of the trellis according to the present invention.
Figure 35D:
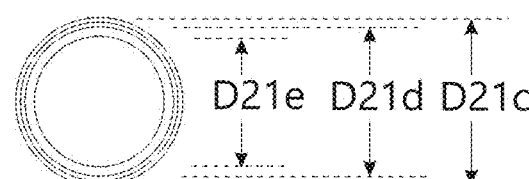
FIG. 35D is a dimensioned bottom view of the interference-fit pole portion of the trellis according to the present invention.

A top perspective view of a pole portion 20a of a trellis is shown in FIG. 35. A dimensioned top view of the pole portion 20a is shown in FIG. 35A, a dimensioned front view of the pole portion 20a is shown in FIG. 35B, a dimensioned cross-section view of the pole portion 20a is shown in FIG. 35C, and a dimensioned bottom view of the pole portion 20a is shown in FIG. 35D. A bottom perspective view of the pole portion 20a is shown in FIG. 35E. The pole portion 20a comprises a top outer cylinder 21a and a top inner cylinder 21b, which are both smooth so that the pole portion 20a may be removably connected to other components using a interference-fit connection rather than a threaded connection. The pole portion 20a also comprises a middle outer cylinder 21c that surrounds a middle hollow cylinder 21e. A bottom inner cylinder 21d is configured opposite the top outer cylinder 21a and top inner cylinder 21b. The bottom inner cylinder 21d is smooth so that the pole portion 20a may be removably connected to other components using a interference-fit connection rather than a threaded connection.

The pole portion 20a has an overall diameter D21c, which is also the diameter of the middle outer cylinder 21c. The top outer cylinder 21a has a diameter D21a, and the top inner cylinder 21b has a diameter D21b. The bottom inner cylinder 21d has a diameter D21b, and the middle hollow cylinder 21e has a diameter D21e. The top inner cylinder 21b and top outer cylinder 21a share a height H21a. The middle outer cylinder 21c has a height H21c. The bottom inner cylinder has a height H21d, which is a portion of H21c.

The diameter D21a is preferably between 3.5 in and 10.5 in, and more preferably is about 6.5 in, and most preferably is 6.5 in. The diameter D21b is preferably between 3.01 in and 10.01 in, and more preferably is about 5.01 in, and most preferably is 5.01 in. The diameter D21c is preferably between 4 in and 12 in, and more preferably is about 9 in, and most preferably is 9 in. The diameter D21d is preferably between 3.51 in and 10.51 in, and more preferably is about 6.51 in, and most preferably is 6.51 in. The height H20 is preferably between 18 in and 26 in, and more preferably is about 24 in, and most preferably is 24 in. The heights H21a and H21d are both preferably between 2 in and 6 in, and more preferably are about 4 in, and most preferably are 4 in. The height H21c is preferably between 14 in and 20 in, and more preferably is about 20 in, and most preferably is 20 in.

Figure 36:
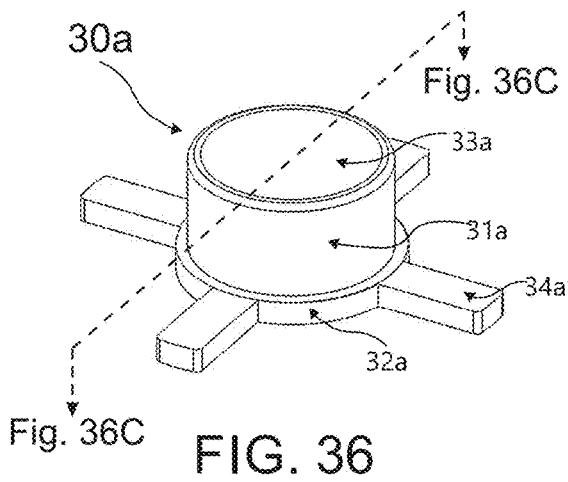
FIG. 36 is a top perspective view of an interference-fit small bottom base of the trellis according to the present invention.
Figure 36A:
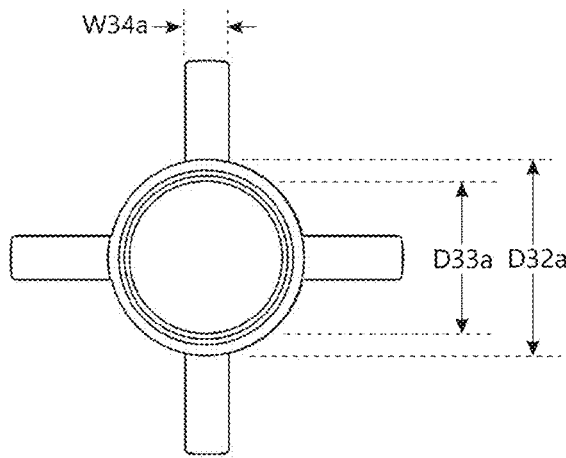
FIG. 36A is a dimensioned top view of the interference-fit small bottom base of the trellis according to the present invention.
Figure 36C:
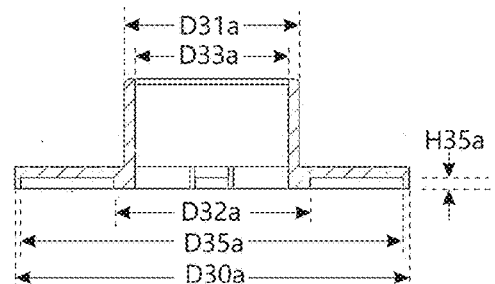
FIG. 36C is a dimensioned cross-sectional view of the interference-fit small bottom base of the trellis according to the present invention.
Figure 36B:
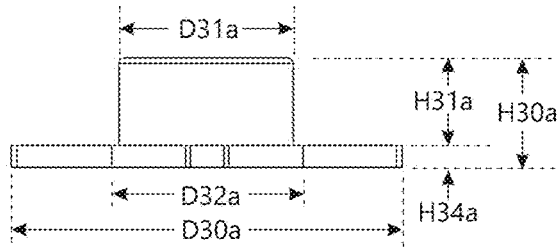
FIG. 36B is a dimensioned front view of the interference-fit small bottom base of the trellis according to the present invention.
Figure 36E:
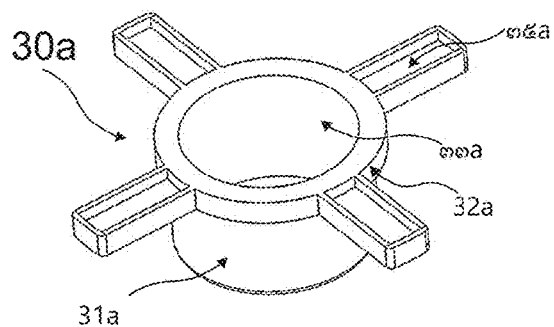
FIG. 36E is a bottom perspective view of the interference-fit small bottom base of the trellis according to the present invention.
Figure 36D:
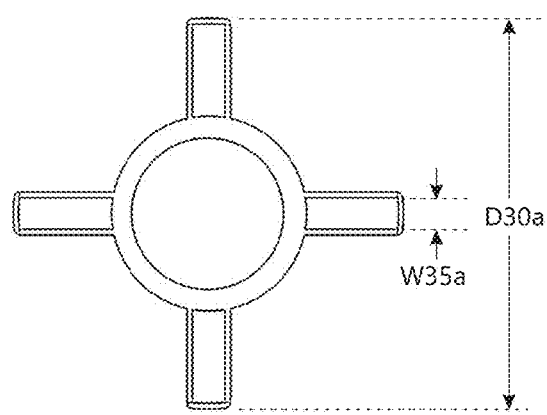
FIG. 36D is a dimensioned bottom view of the interference-fit small bottom base of the trellis according to the present invention.

A top perspective view of a small bottom base 30a of a trellis is shown in FIG. 36. A dimensioned top view of the small bottom base 30a is shown in FIG. 36A, a dimensioned front view of the small bottom base 30a is shown in FIG. 36B, a dimensioned cross-section view of the small bottom base 30a is shown in FIG. 36C, and a dimensioned bottom view of the small bottom base 30a is shown in FIG. 36D. A bottom perspective view of the small bottom base 30a is shown in FIG. 36E. The small bottom base 30a comprises an exterior top cylinder 31a and an interior top cylinder 33a, which are both smooth so that the small bottom base 30a may be removably connected to other components using a interference-fit connection rather than a threaded connection. A plurality of wings 34a extend from a circular base 32a. A hollow bottom chamber 35a extends into each of the plurality of wings 34a. The hollow bottom chambers 35a may serve to reduce the weight of the small bottom base 30a. Four rectangular wings 34a are shown in FIGS. 36-36E. This is not intended to limit the number of wings 34a to four, nor to limit the exact shape of the wings 34a. The number of wings 34a may be three or more, four or more, five or more, or any other number of wings.

The small bottom base 30a has an overall diameter D30a that exists as the length from the tip of one wing to the tip of an opposing wing. The small bottom base 30a also has a diameter D35a that exists as the length from the tip of one hollow bottom chamber to the tip of an opposing hollow bottom chamber. The exterior top cylinder 31a has a diameter D31a, and the interior top cylinder 33a has a diameter D33a. The circular base 32a has a diameter D32a. The small bottom base 30a has an overall height H30a. The exterior top cylinder 31a and interior top cylinder 33a share a height H31a. Each wing 34 has a height H34a and a width W34a. Each hollow bottom chamber 35a has a height H35a and a width W35a.

The diameter D30a is preferably between 16 in and 18 in, and more preferably is about 18 in, and most preferably is 18 in. The diameter D35a is preferably between 15.5 in and 17.5 in, and more preferably is about 17.5 in, and most preferably is 17.5 in. The diameter D31a is preferably between 3.5 in and 10.5 in, and more preferably is about 6.5 in, and most preferably is 6.5 in. The diameter D32a is preferably between 4 in and 12 in, and more preferably is about 9 in, and most preferably is 9 in. The diameter D33a is preferably between 3 in and 9.5 in, and more preferably is about 5.5 in, and most preferably is 5.5 in. The width W34a is preferably between 2 in and 4 in, and more preferably is about 2 in, and most preferably is 2 in. The width W35a is preferably between 1.5 in and 3.5 in, and more preferably is about 1.5 in, and most preferably is 1.5 in. The height H30a is preferably between 2.5 in and 8 in, and more preferably is about 5 in, and most preferably is 5 in. The height H31a is preferably between 2 in and 6 in, and more preferably is about 4 in, and most preferably is 4 in. The height H34a is preferably between 1 in and 2 in, and more preferably is about 1 in, and most preferably is 1 in. The height H35a is preferably between ½ in and 1 in, and more preferably is about ½ in, and most preferably is ½ in.

Figure 37:
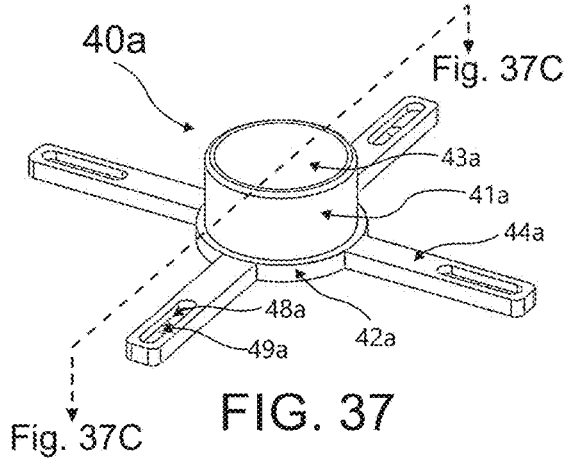
FIG. 37 is a top perspective view of an interference-fit large bottom base of the trellis according to the present invention.
Figure 37A:
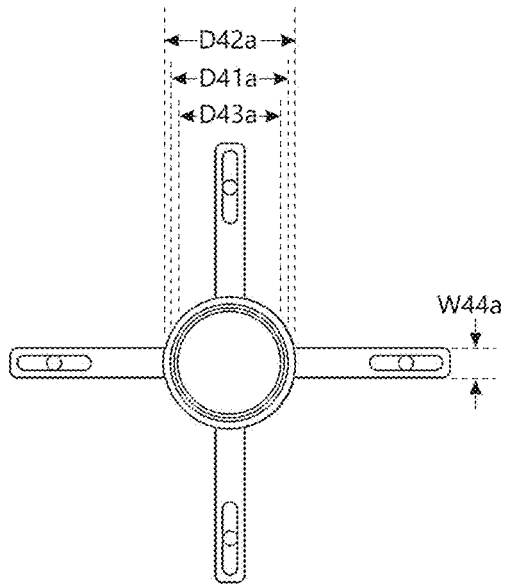
FIG. 37A is a dimensioned top view of the interference-fit large bottom base of the trellis according to the present invention.
Figure 37C:
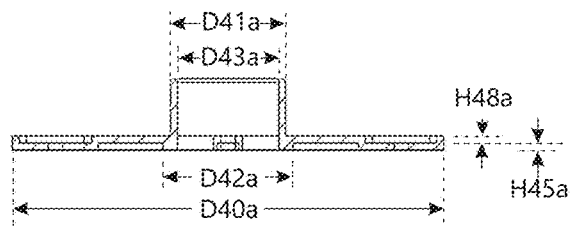
FIG. 37C is a dimensioned cross-sectional view of the interference-fit large bottom base of the trellis according to the present invention.
Figure 37B:
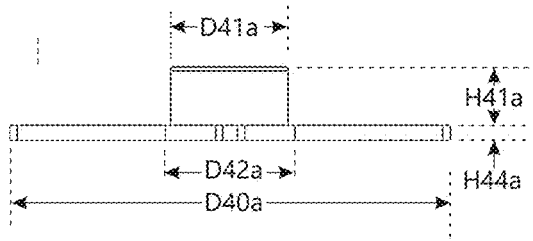
FIG. 37B is a dimensioned front view of the interference-fit large bottom base of the trellis according to the present invention.
Figure 37E:
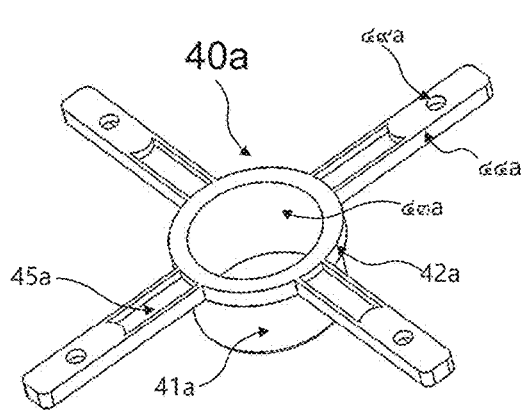
FIG. 37E is a bottom perspective view of the interference-fit large bottom base of the trellis according to the present invention.
Figure 37D:
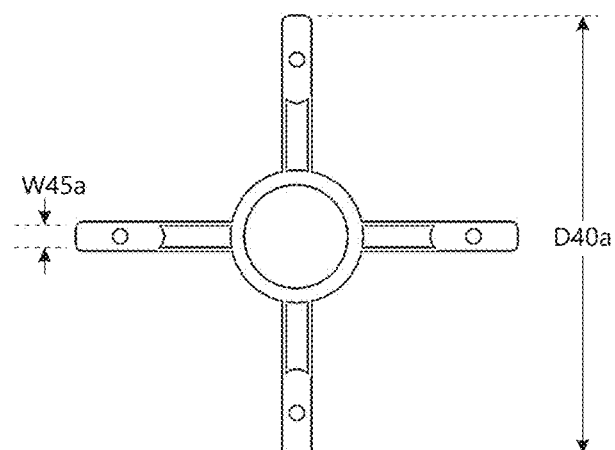
FIG. 37D is a dimensioned bottom view of the interference-fit large bottom base of the trellis according to the present invention.

A top perspective view of a large bottom base 40a of a trellis is shown in FIG. 37. A dimensioned top view of the large bottom base 40a is shown in FIG. 37A, a dimensioned front view of the large bottom base 40a is shown in FIG. 37B, a dimensioned cross-section view of the large bottom base 40a is shown in FIG. 37C, and a dimensioned bottom view of the large bottom base 40a is shown in FIG. 37D. A bottom perspective view of the large bottom base 40a is shown in FIG. 37E. The large bottom base 40a comprises an exterior top cylinder 41a and an interior top cylinder 43a, which are both smooth so that the large bottom base 40a may be connected to other components using a interference-fit connection rather than a threaded connection. A plurality of wings 44a extend from a circular base 42a. A hollow bottom chamber 45a extends into each of the plurality of wings 44a. The hollow bottom chambers 45a may serve to reduce the weight of the large bottom base 40a. Four rectangular wings 44a are shown in FIGS. 37-37E. This is not intended to limit the number of wings 44a to four, nor to limit the exact shape of the wings 44a. The number of wings 44a may be three or more, four or more, five or more, or any other number of wings.

Each wing 44a comprises a securing chamber 48a and a securing hole 49a. A T-nail 50 may be inserted through each securing hole 49a whereby the top securing bar 51 of the T-nail 50 may rest with in the securing chamber 48a.

The large bottom base 40a has an overall diameter D40a that exists as the length from the tip of one wing to the tip of an opposing wing. The exterior top cylinder 41a has a diameter D41a, and the interior top cylinder 43a has a diameter D43a. The circular base 42a has a diameter D42a. The exterior top cylinder 41a and interior top cylinder 43a share a height H41a. Each wing 44 has a height H44a and a width W44a. Each hollow bottom chamber 45a has a height H45a and a width W45a. Each securing chamber 48a has a depth H48a.

The diameter D40a is preferably between 24 in and 48 in, and more preferably is about 30 in, and most preferably is 30 in. The diameter D41a is preferably between 3.5 in and 10.5 in, and more preferably is about 6.5 in, and most preferably is 6.5 in. The diameter D42a is preferably between 4 in and 12 in, and more preferably is about 9 in, and most preferably is 9 in. The diameter D43a is preferably between 3 in and 9.5 in, and more preferably is about 5.5 in, and most preferably is 5.5 in. The width W44a is preferably between 2 in and 4 in, and more preferably is about 2 in, and most preferably is 2 in. The width W45a is preferably between 1.5 in and 3.5 in, and more preferably is about 1.5 in, and most preferably is 1.5 in. The height H41a is preferably between 2 in and 6 in, and more preferably is about 4 in, and most preferably is 4 in. The height H44a is preferably between 1 in and 2 in, and more preferably is about 1 in, and most preferably is 1 in. The height H45a is preferably between ½ in and 1 in, and more preferably is about ½ in, and most preferably is ½ in. The depth H48a is preferably between ½ in and 1 in, and more preferably is about ½ in, and most preferably is ½ in.

Figure 38:
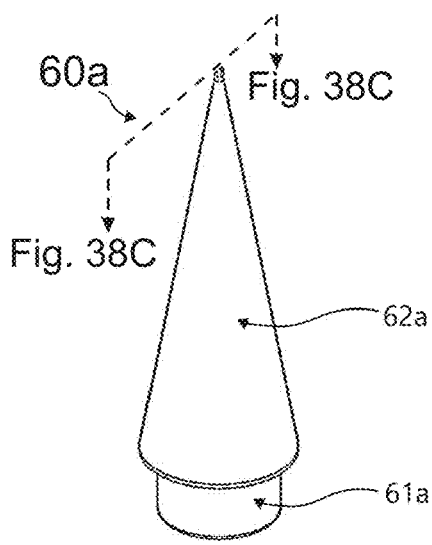
FIG. 38 is a top perspective view of an interference-fit light pole of the trellis according to the present invention.
Figure 38A:
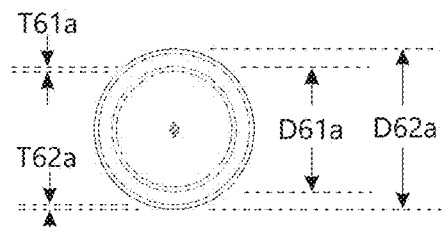
FIG. 38A is a dimensioned top view of the interference-fit light pole of the trellis according to the present invention.
Figure 38C:
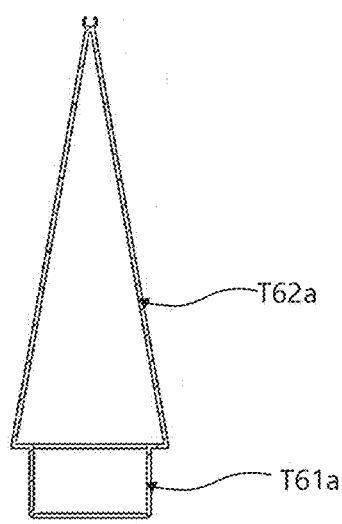
FIG. 38C is a dimensioned cross-sectional view of the interference-fit light pole of the trellis according to the present invention.
Figure 38B:
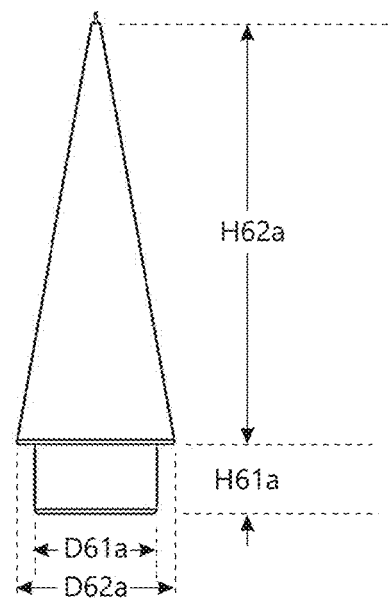
FIG. 38B is a dimensioned front view of the interference-fit light pole of the trellis according to the present invention.
Figure 38E:
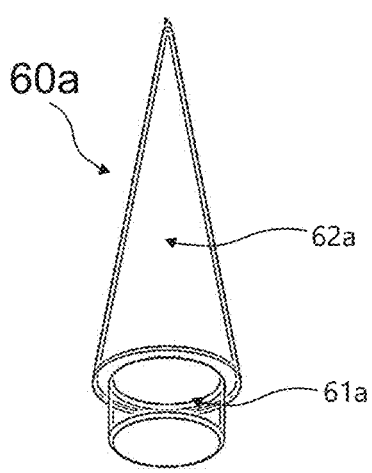
FIG. 38E is a bottom perspective view of the interference-fit light pole of the trellis according to the present invention.
Figure 38D:
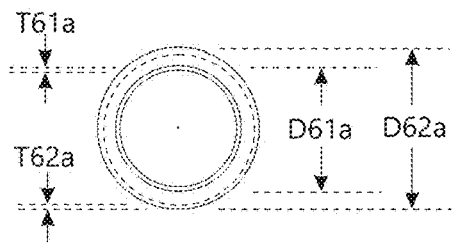
FIG. 38D is a dimensioned bottom view of the interference-fit light pole of the trellis according to the present invention.

A top perspective view of a light pole 60a of a trellis is shown in FIG. 38. A dimensioned top view of the light pole 60 is shown in FIG. 38A, a dimensioned front view of the light pole 60a is shown in FIG. 38B, a dimensioned cross-section view of the light pole 60a is shown in FIG. 38C, and a dimensioned bottom view of the light pole 60a is shown in FIG. 38D. A bottom perspective view of the light pole 60a is shown in FIG. 38E. The light pole 60a comprises a tapered cylinder 62a and an outer bottom cylinder 61a is configured adjacent to the wide end of the tapered cylinder 62a. Both the tapered cylinder 62a and outer bottom cylinder 61a are hollow to reduce the weight of the light pole 60a. The outer bottom cylinder 61a is smooth so that the light pole 60a may be removably connected to other components using a interference-fit connection rather than a threaded connection.

The tapered cylinder 62a has a bottom diameter D62a, a height H62a, and a wall thickness T62a. The outer bottom cylinder 61a has a diameter D61a, a height H61a, and a wall thickness T61a. The diameter D61a is preferably between 3 in and 10 in, and more preferably is about 5.5 in, and most preferably is 5.5 in. The diameter D62a is preferably between 4 in and 12 in, and more preferably is about 9 in, and most preferably is 9 in. The height H61a is preferably between 3 in and 6 in, and more preferably is about 4 in, and most preferably is 4 in. The height H62a is preferably between 18 in and 36 in, and more preferably is about 24 in, and most preferably is 24 in. The thicknesses T61a and T62a are preferably between ⅛ in and ½ in, and more preferably are about 3/16 in, and most preferably are 3/16 in.

The interference-fit connections shown in FIGS. 32-38D vary from the threaded connections shown in FIGS. 1-31D. While the threaded connections are formed by mating pairs of threads, the interference-fit connections are formed by friction present between two smooth mating cylinders. The mating cylinders of the components shown in FIGS. 32-38D are dimensioned such that when the components are fit together, the friction between the components is sufficient to hold the components together, but not excessive so that the interference-fit connections between the components may be broken by simply pulling the components away from one another manually. This is similar to a press-fit connection known in mechanical engineering. However, while a press-fit connection implies a permanent connection between mating components, a interference-fit connection is a removable connection between components.

The top outer cylinder 21a of a bottom pole portion may be removably interference-fit into the bottom inner cylinder 21d of a top pole portion. The middle cylinder 11a of the top supporter 10a may be removably interference-fit onto the top outer cylinder 21a of the top pole portion. The outer bottom threaded cylinder 61a of the light pole 60a may be removably interference-fit into the top inner cylinder 21b of the top pole portion. The top threads cylinder 31a, 41a of the small bottom base 30a or the large bottom base 40a, respectively, may be removably interference-fit into the bottom inner cylinder 21d of the bottom pole portion. In this manner, the trellis may be assembled and disassembled using interference-fit connections.

I claim:
1. A trellis comprising:
   a bottom base;
   a top supporter;
   a plurality of pole portions having:
   a top pole portion removably connected to the top supporter;

a bottom pole portion removably connected between the top pole portion and the bottom base, wherein each of the plurality of pole portions having a middle hollow cylinder with a perforated chamber;

the bottom base comprises a plurality of wings, each of the plurality of wings having:

a securing chamber; and a securing hole.

2. The trellis of claim 1, wherein the plurality of pole portions further comprises a middle pole portion removably connected between the top pole portion and the bottom pole portion.

3. The trellis of claim 1, wherein each of the plurality of pole portions further comprise:

a top cylinder having external threads; and a bottom cylinder having internal threads.

4. The trellis of claim 3, wherein the top cylinder has a height between 3 in and 5 in, wherein the bottom cylinder has a height between 3 in and 5 in, and wherein the middle hollow cylinder has a height between 15 in and 21 in.

5. The trellis of claim 1, further comprising T-nails, wherein each T-nail is configured through the securing hole of the bottom base, wherein a top securing bar of each T-nail rests within the securing chamber of the bottom base to secure the bottom base to the ground.

6. The trellis of claim 1, wherein the bottom base is configured within a nursery pot.

7. The trellis of claim 6, wherein the nursery pot has a bottom base diameter greater than 18 in.

8. The trellis of claim 1, wherein the top supporter comprises:

a middle cylinder;

a plurality of empty spaces surrounding the middle cylinder;

a plurality of general holes; and a top surface.

9. The trellis of claim 1, further comprising a light pole having an overall length of about 29 in.

10. The trellis of claim 9, wherein the light pole is removably connected to the top pole portion.

11. The trellis of claim 9, wherein the light pole is removably connected to the top supporter.

12. The trellis of claim 9, wherein the trellis has an overall height between 66 in and 107 in.

13. The trellis of claim 1, wherein the trellis has an overall height between 48 in and 71 in.

14. The trellis of claim 1, wherein the top supporter has a length between 24 in and 48 in, a width between 24 in and 48 in, and a height between 2 in and 6 in.

15. The trellis of claim 1, wherein each of the plurality of pole portions have a height between 18 in and 26 in, and a diameter between 4 in and 12 in.

16. The trellis of claim 1, wherein the bottom base has a width between 18 in and 48 in.

17. The trellis of claim 1, wherein each of the plurality of wings have a length between 4.5 in and 18 in.

18. A trellis comprising:

a bottom base having a width between 18 in and 48 in;

a top supporter having a length of about 30 in, a width of about 30 in, and a height of about 4 in;

a plurality of pole portions each having a middle hollow cylinder with a height of about 20 in; and a light pole with a tapered cylinder having a height of about 24 in, wherein the bottom base, the top supporter, the plurality of pole portions, and the light pole are removably connected to one another whereby the trellis has an overall height of about 89 in.

19. A trellis system comprising:

a plurality of trellises, each trellis comprising:

a plurality of pole portions removably connected to one another, wherein each of the plurality of pole portions comprises a middle hollow cylinder having a perforated chamber;

a bottom base removably connected to the plurality of pole portions;

a top supporter removably connected to the plurality of pole portions;

a light pole removably connected to the plurality of pole portions or to the top supporter;

electrical wires supported by the light poles of each of the plurality of trellises; and lights electrically coupled to the electrical wires.

* * * * *